United States Patent
Erickson et al.

(10) Patent No.: US 6,892,210 B1
(45) Date of Patent: May 10, 2005

(54) DATABASE MANAGEMENT AND SYNCHRONIZATION ACROSS A PEER-TO-PEER NETWORK

(75) Inventors: Jason Erickson, Albany, CA (US); Alan Wood, Berkeley, CA (US); Doug Dropeskey, Benicia, CA (US)

(73) Assignee: Worldsync, Inc., Berkeley, CA (US)

( * ) Notice: Subject to any disclaimer, the term of this patent is extended or adjusted under 35 U.S.C. 154(b) by 342 days.

(21) Appl. No.: 10/039,641

(22) Filed: Dec. 31, 2001

Related U.S. Application Data

(60) Provisional application No. 60/259,425, filed on Dec. 29, 2000.

(51) Int. Cl.[7] .............................................. G06F 17/30
(52) U.S. Cl. ......................... 707/201; 707/8; 707/203; 715/511
(58) Field of Search ............................... 707/1, 2, 3, 8, 707/10, 201, 202, 203, 204; 711/162; 709/221, 223; 715/511; 345/335

(56) References Cited

U.S. PATENT DOCUMENTS

| | | | | |
|---|---|---|---|---|
| 5,129,082 A | * | 7/1992 | Tirfing et al. ................... 707/3 |
| 5,392,390 A | * | 2/1995 | Crozier ....................... 345/762 |
| 5,434,994 A | * | 7/1995 | Shaheen et al. ............ 709/223 |
| 5,581,753 A | * | 12/1996 | Terry et al. ................... 707/201 |
| 5,649,195 A | * | 7/1997 | Scott et al. .................. 707/201 |
| 5,671,407 A | * | 9/1997 | Demers et al. ................. 707/8 |
| 5,684,984 A | * | 11/1997 | Jones et al. .................... 707/10 |
| 5,684,990 A | * | 11/1997 | Boothby ....................... 707/203 |
| 5,689,705 A | * | 11/1997 | Fino et al. ................... 707/201 |
| 5,689,706 A | * | 11/1997 | Rao et al. .................... 707/201 |
| 5,710,922 A | * | 1/1998 | Alley et al. .................. 707/201 |
| 5,870,759 A | | 2/1999 | Bauer et al. |
| 5,870,765 A | | 2/1999 | Bauer et al. |
| 5,884,325 A | | 3/1999 | Bauer et al. |
| 5,926,816 A | | 7/1999 | Bauer et al. |

OTHER PUBLICATIONS

Agrawal D. et al., "Epidemic Algorithms in Replicated Databases (Extended Abstract)", Proceedings of the Sixteenth ACM SIGACT–SIGMOD–SIGART symposium on Principles of database systems, May 1997, pp. 161–172.*

Demers, Alan et al., "Epidemic Algorithms For Replicated Database Maintenance", Proceedings of the Sixth ACM symposium on Principles of distributed computing, Dec. 1987, pp. 1–12.*

* cited by examiner

*Primary Examiner*—Shahid Alam
(74) *Attorney, Agent, or Firm*—Jay P. Hendrickson

(57) ABSTRACT

A database management and synchronization program implemented across a peer-to-peer computer network, consisting of a sharing community of user computers. Database record synchronization throughout the sharing community is accomplished by using a synchronization object which contains the information about a change in a specific record or the addition of a new record. The synchronization object is transmitted by a local user computer at any time to a routing agent, which in turn transmits the synchronization object at any time to remote user computers within the sharing community. The synchronization object is then used by the remote user computer to update their database records.

10 Claims, 25 Drawing Sheets

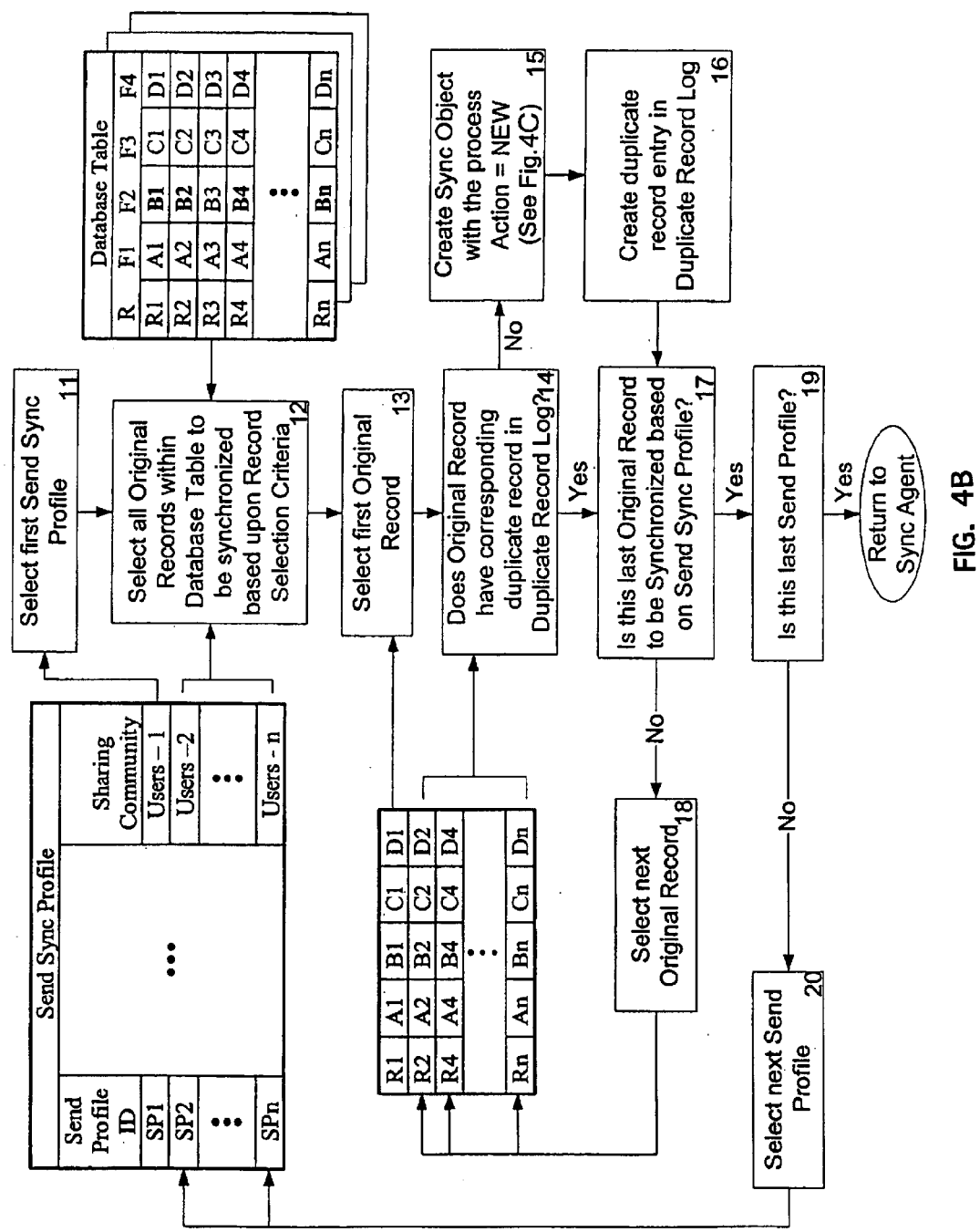

| | | Sync Object | | | |
|---|---|---|---|---|---|
| 1 Sync Computer Address (email address) | 2 Sync Record Table Address | 3 Version Date/Time (date and time Sync Record last updated and added to Duplicate Record Log) | 4 Sync Object ID (randomly assigned number) | 5 Action (EDIT, DELETE or NEW) | 6 Editor Computer Address (email address) |
| dan@domain.com | D1/T1 | 1/1/02 09:55:04 | 836514 | EDIT | dan@domain.com |
| 7 Editor Table Address | 8 Date and Time (date and time Sync Object created) | 9 Size (Bytes) | 10 Primary Record Key | 11 Record ID (Record that was modified) | 12 Field List | 13 Content of fields "before" change | 14 Content of fields "after" change |
| D1/T1 | 1/1/02 10:33:14 | 100Kb | R | R1 | F2 F3 F4 | B1 C1 D1 | B1' C1' D1' |

FIG. 5

| | | Sync Object Inbound Process Log | | | | |
|---|---|---|---|---|---|---|
| A Entry No. | B Receive Sync Profile ID | 1 Sync Computer Address (email address) | 2 Sync Record Table Address | 3 Version Date/Time (date and time Sync Record last updated and added to Duplicate Record Log) | 4 Sync Object ID (randomly assigned number) | 5 Action (EDIT, DELETE or NEW) | 6 Editor Computer Address (email address) |
| 1 | RP1 | dan@domain.com | D1/T1 | 1/1/02 09:55:04 | 836514 | EDIT | dan@domain.com |

| 7 Editor Table Address | 8 Date and Time (date and time Sync Object created) | 9 Size (Bytes) | 10 Primary Record Key | 11 Record ID (Record that was modified) | 12 Field List | 13 Content of fields "before" change | 14 Content of fields "after" change |
|---|---|---|---|---|---|---|---|
| D1/T1 | 1/1/02 10:33:14 | 100Kb | R | R1 | F2 F3 F4 | B1 C1 D1 | B1' C1' D1' |

FIG. 7

DATABASE MANAGEMENT AND SYNCHRONIZATION ACROSS A PEER-TO-PEER NETWORK

This application claims the benefit of Provisional application Ser. No. 60/259,425 filed Dec. 29, 2000.

BACKGROUND OF THE INVENTION

The age of the Internet, still in its infancy, has already produced a dramatic change in information access across the globe. While web sites and unstructured email predominate as the vehicles of choice for information access, numerous competing mediums, both old and new, are also benefiting from the profound power of this massively interconnected computer network. Among these, the Internet has breathed new life into the use of distributed database systems. Distributed Systems is used here to represent the propagation of multiple copies of like databases to disparate locations as opposed to the use of direct access to a central individual copy of a database. At first glance the use of Distributed Systems across the Internet appears in opposition to the principal of the Internet—real-time access. However, this not only overestimates the degree to which access is constant or acceptably fast for all concerned, but also ignores the benefits of redundancy, cross-referencing and decentralization.

With Distributed Systems—at least insofar as modifiable structured database systems are concerned—comes the need to keep multiple copies of any particular piece of data the same throughout all databases in which it may exist. The prior art provides many techniques to solve this need. These divide generally across three axis points: synchronization method (direct comparison vs. replication); distribution methodology (client-server vs. peer-to-peer); and modifiability (master-slave vs. open modification access).

The synchronization axis relates to the means by which two database systems are capable of knowing what changes have taken place on one or both databases. Direct comparison, is meant here to represent the process of direct comparison between two databases on a record-by-record basis to discover and correct differences between them. This can be distinguished from replication, which represents the general methodology of capturing a reflection of database operations as they occur to one database so that these operations can be played out or replicated on one or more other databases. The prior art has generally favored replication for its efficiency and scalability. Efficiency is gained by the fact that less communication is required between two databases if each comes to the table already knowing what changes have occurred to itself since last communication. Scalability is gained by the fact that the replication instructions which have been locally collected can be shared with multiple database copies, whereas a process of direct comparison requires unique comparison for each additional database (A to C; A to B; . . . A to n).

The distribution axis pertains to the method by which one database copy interacts with one or more other database copies to maintain synchronization. This is less about the actual communication link used and more about the structure of the community of database copies and the roles each will play in relation to each other. Client-server is used here to represent a centrally or hierarchically derivative methodology, whereby authority within the community emanates from a central point, through which consistency and security are ensured. The clients in the network do not communicate with each other, but rather with the server, each relying on their direct relationship with the server to accomplish synchronization with other clients. In the peer-to-peer methodology, however, each peer communicates with all other peers, none of whom play a role significantly different from each other. Each methodology has advantages and disadvantages. Client-server methodologies benefit from greater consistency and control over data, as well as reduction of processing demands on client machines, while suffering from limitations to scalability, problems concerning bottlenecks in data throughput and a lack of flexibility and distribution of authority. Meanwhile, peer-to-peer methodologies provide for a decentralized environment, helping to alleviate problems of bottlenecks in communications and offering greater flexibility, but suffer from increased demands on local processing, threats to data consistency due to a lack of central authority and also suffer limits to scalability in cases where direct connection is necessary between each peer which originates a change and each peer which must receive the change.

The modifiability axis concerns limitations on who can make changes to records. A dichotomy is formed in the prior art along this axis as to whether or not more than one site is allowed to modify any particular record. For obvious reasons, imposing this limitation greatly reduces the complexity of synchronization, because it removes the need to handle conflicting edits to the same records. However, this imposes very restrictive limitations on users of and interfaces into these systems, as this requires a user at a remote location to access data at the "master" location in order to modify it.

As illustrated according to the axis points described above, those examples in the prior art which allow for replication (vs. direct comparison) across either a client-server or peer-to-peer network and which allow for data to be modified from any copy of the database provide the greatest functionality to distributed systems. However, as also is illustrated above, both the client-server and peer-to-peer methodologies suffer limitations.

SUMMARY OF THE INVENTION

The present invention offers a method of database replication, in a peer-to-peer environment, without the need for constant, complex or costly computer links between peers to achieve the goal. The need for consistency and control of synchronization is instead achieved in accordance with the software operations of the invention. Further, the invention offers the advantages of data consistency and control as are provided by client-server systems in the prior art, while being liberated from the scalability and flexibility limitations of a centralized architecture. The invention also offers the sharing flexibility and scalability of a peer-to-peer architecture while providing for more efficient communication and greater control of data consistency due to its unique use of distributable, record-level custodianship. Finally, the present invention offers a method of synchronization which operates efficiently and effectively across both a spatially and temporally disjunct community of peers.

The present invention comprises a method and system which provides for the synchronization of shared database records in a structured database information system across a non-concentric peer-to-peer sharing community. However, the invention does not require, as in a client-server model, that a complete collection of all structured data be stored in a single server computer, nor does the invention require that a master copy of all shared database records be maintained on a single server computer serving a community of client computers. Rather, the present invention enables all users within the community to modify shared database records and to potentially propagate the modifications to all other users within the community at any time that a community member computer elects to perform the operation. In general, the invention accomplishes this result by embedding information about a user's modification to a specific database record into a synchronization object or Sync Object. The Sync Object may then be used to similarly modify all other shared records within the community. Although all users within the record sharing community may modify or edit records, each database record is also associated with a single user computer which is given the ultimate authority to resolve conflicting modifications to the same record. Every record in any database table may potentially be associated with a different computer of authority.

Another important feature of the present invention is that synchronization of database records that have been modified may be performed by a user operating his or her computer at any time, and it is not necessary that the computers of the other community members, whose database records are to be synchronized, are operating at the time the modification is sent to the members. As a result, the present invention provides for a dynamic synchronization system that allows all users within the community to synchronize modifications to database records and to simultaneously maintain a coherency between all databases despite wide spatial and temporal disjunction.

The following are key terms and their definitions, as used in the invention:

1. "Computer User" is a person operating a User Computer.
2. "Corresponding Database Table" refers to a Database Table at a Remote Computer that contains a Corresponding Record to an Original Record at a Local Computer.
3. "Corresponding Database Table Record" or "Corresponding Record" refers to an Original Record on a Remote User Computer that has the same primary record key as that of an Original Record on a Local Computer.
4. "Corresponding Field" refers to a Field name or identification that has the same name or identification as that of at least one other Field.
5. "Database" or "Database Table" is the term given to the structured information system containing data to be shared. The Database is structurally composed of one or more tables. Each table contains cells or storage locations which are arranged in rows and columns. The content of a Database is the data or information which is stored in the cells.
6. "Duplicate Record" means a copy of an Original Record.
7. "Editor" means a Computer User or Subscriber who has modified or changed an Original Record within a Local Database Table or a Remote Database Table.
8. "Field" means a cell within a Record containing the smallest amount of information, data or content that is accessible by computer software. A Field is also referred to as a column within a Database Table.
9. "Local Computer" refers to a User Computer that sends a Sync Object to a Remote Computer.
10. "Local Database Table" or "Local Table" refers to a Database Table that is associated with the creation of a Sync Object due to a change in a Original Record within the Local Database Table.
11. "Non-Concentric" means that any particular Record may be shared with as many or as few Computer Users as dictated by need, and that no single database necessarily contains every Record shared in common by any two or more other Computer Users.
12. "Original Record" means a Record within a Local Database Table or within a Remote Database Table.
13. "Peer-to-Peer" means at least two computers connected by one or more routing agents over a network, but does not require a direct communication between any two peers.
14. "Record" or "Database Record" means a row of cells within a Database.
15. "Remote Computer" or "Remote Computer User" refers to a User Computer that receives a Sync Object through a routing agent from a Local Computer.
16. "Remote Database Table" or "Remote Table" refers to a Database Table that is associated with the utilization of a Sync Object to potentially update an Original Record within the Remote Database Table so that said Original Record matches the corresponding Original Record within the Local Database Table.
17. "Sharing Community" refers to the collection of Computer Users who exchange information about any particular Record. The Sharing Community is determined by identifying those Computer Users who desire to have a specific Record or collection of Records Synchronized or updated when other users within the community modify the same Record or Records.
18. "Subscriber" means a Computer User who is a user within the Sharing Community and who does not maintain the Sync Record for this sharing community.
19. "Synchronization" or "Synchronize" means that modifications made by one Computer User in his or her Local Database are similarly made to the same Record in those Remote Databases within the Sharing Community.
20. "Sync Computer" as relative to a particular Record, is a specific User Computer within the Sharing Community that contains the Sync Record for the Sharing Community.
21. "Sync Object" is an object containing information about a change to an Original Record and is used to synchronize the change in the Original Record throughout the Sharing Community.
22. "Sync Record" refers to a specific Original Record that is associated with a specific Database Table within a specific User Computer. The Sync Record is used to Synchronize changes in an Original Record which corresponds to the Sync Record for each Subscriber within the Sharing Community.
23. "User Computer" means a computer, operated by a Computer User, which is in indirect electronic communication with other User Computers as part of a Peer-to-Peer, rather than a client-server, network.

In general, the invention is implemented by providing a software synchronizing agent ("Sync Agent") to a plurality of Computer Users who desire to share and manage specific Records within a plurality of Databases. The Sync Agent is designed such that it is able to interact with and Synchronize the Database data without disrupting or otherwise affecting the database application software which allows users to interact with and manage the Database. The Sync Agent is generally comprised of six (6) subprogram functions which, in the preferred embodiment, are capable of working independently of one another to perform a process which collectively results in Synchronization. The six (6) subprograms are: Initialization, Sync Object Creator, Sync Object Sender, Sync Object Receiver, Sync Object Unpacker, and Sync Object Processor.

The Initialization subprogram is responsible for establishing a starting state on a User Computer as a means to identify Database modifications which take place after said starting state. The Sync Object Creator is responsible for capturing information about changes which have been made to the Original Records within a Local Database and for creating a Sync Object for each Record that was created, modified or deleted at the Local Database since the last time the Sync Object creation process was performed. Each Sync Object contains all of the information and data needed to potentially make the same change to the same Record within all of the Remote Databases within the Sharing Community. The Sync Object Sender subprogram is responsible for sending Sync Objects to the other Computer Users in the Sharing Community, by means of one or more routing agent computers according to the conventions of distributed information messaging. A simplified and highly scaleable and inexpensive form of this communication scheme can effectively be employed by the use of email servers with functionality that is readily provided in the SMTP and POP3 protocols. The Sync Object Receiver is responsible for retrieving Sync Objects intended for the Remote Database, from one or more routing agent computers, again according to the conventions of distributed information messaging. The Sync Object Unpacker takes messages received by the Sync Receiver and uses these to build a Sync Object Inbound Process Log. The Sync Object Processor operates on the Sync Objects in the Sync Object Inbound Process log to modify the Records on the same user computer.

BRIEF DESCRIPTION OF THE DRAWINGS

FIGS. 4A and 4B are flow charts illustrating the Sync Object Creator subprogram process.

FIG. 5 is a schematic representation of a Sync Object.

FIG. 7 is a schematic representation of the Sync Object Inbound Process Log.

DETAILED DESCRIPTION OF THE PRESENT INVENTION

Figure 1A:
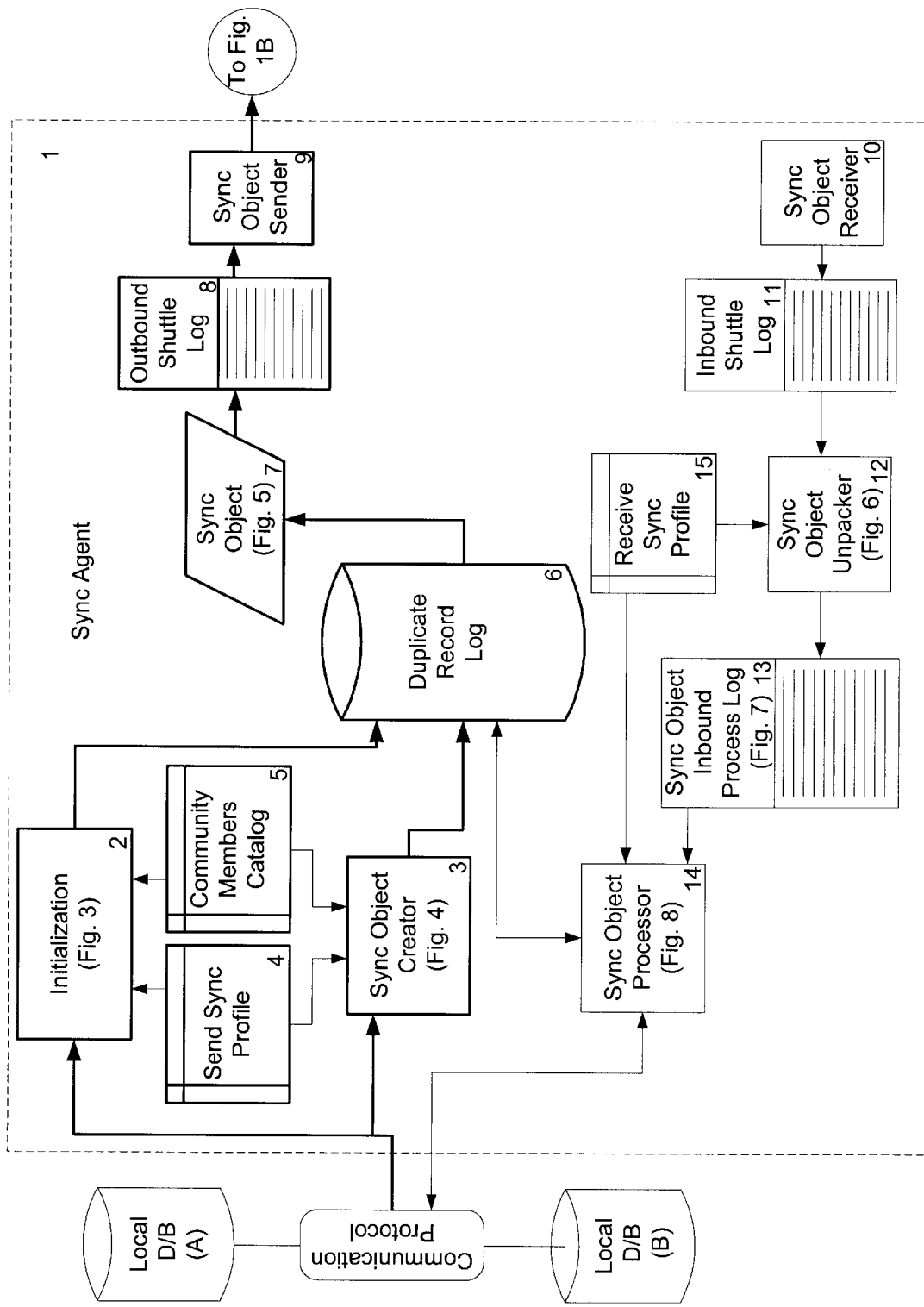
FIG. 1A is a block diagram which illustrates the computer architecture of the present invention from the standpoint of a Computer User operating a Local Computer containing at least one Local Database which is to be Synchronized with at least one Remote Database within a Remote Computer.
Figure 1B:
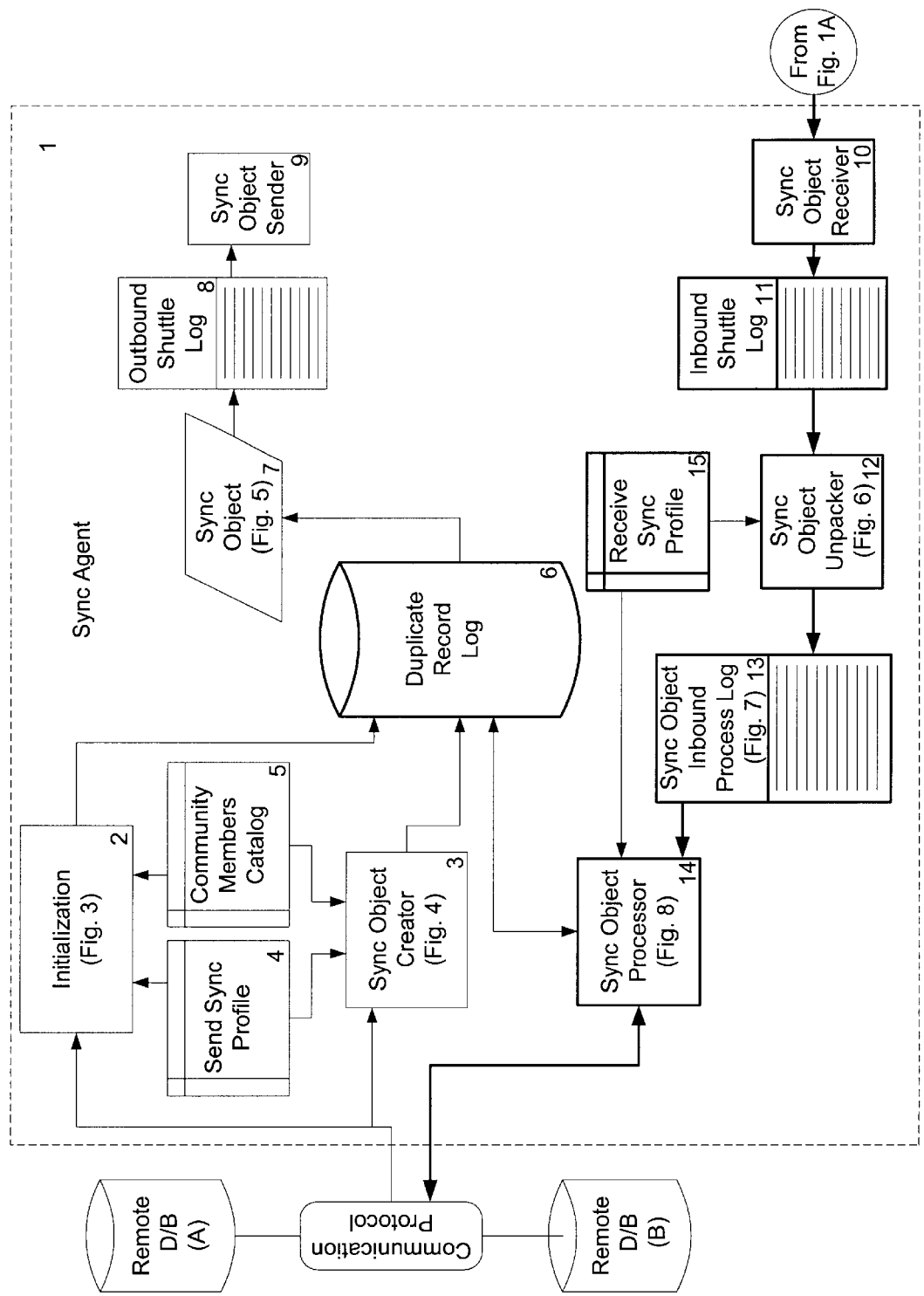
FIG. 1B is a block diagram which illustrates the computer architecture of the present invention from the standpoint of a Computer User operating a Remote Computer containing at least one Remote Database which is to be Synchronized with at least one Local Database within a Local Computer. FIG.'s 1C, 1D, 1E and 1F further illustrate the peer-to-peer network of User Computers with a routing agent.

The present invention comprises a method and system which provides for the Synchronization of shared Database Records in a structured Database information system across a Non-Concentric Peer-to-Peer computer Sharing Community. A general description of the present invention is set forth in FIGS. 1A and 1B. The block diagrams illustrate the relationship between Databases which are stored in the memory of a User Computer and the invention's Sync Agent 1 software program which creates, distributes and processes Sync Objects 7 in order to Synchronize the same Databases stored in the memory of other User Computers within the Sharing Community. The block diagram in FIG. 1A illustrates the architecture of the present invention from the standpoint of a Computer User operating a User Computer containing at least one Local Database which is to be Synchronized with at least one Remote Database contained within another User Computer within the Non-Concentric Peer-to-Peer Sharing Community. FIG. 1B illustrates the architecture of the invention from the standpoint of a Computer User operating a User Computer containing at least one Remote Database. Since the invention uses the same architecture as that of ++++ all User Computers, the figures are identical with the exception that FIG. 1A refers to Local Databases A and B, and FIG. 1B refers to Remote Databases A and B. Further, although FIG. 1B refers to a single User Computer containing two Remote Databases, the figure is equally applicable to a plurality of User Computers, which are all part of the Sharing Community.

Referring to FIGS. 1A and 1B, the invention is implemented by initially installing the Sync Agent 1 program in the memory of all User Computers within the Sharing Community. The Sync Agent 1 program is generally responsible for accessing the databases, coordinating the operation of all other subprograms with the operation of the database application programs, and providing data to the subprograms within the Sync Agent 1. In the preferred embodiment, the Sync Agent 1 uses Open Database Connectivity (ODBC) to communicate with Databases stored in the memory of the computer on which it is installed. However, any means of connectivity that enables the Sync Agent 1 to perform Record selection queries, as well as adds, changes and deletes to individual Records, could be used without altering the nature of the invention. The Sync Agent 1 operates according to instructions specified in various profiles internal to the invention. In the preferred embodiment, these profiles are themselves constructed as a series of database tables, internal to the invention. The Sync Agent 1 software, ideally being constructed as a background service program, is not itself intended to have a user-interface. However, in accordance with the invention, it is constructed so as to allow for access to its internal Databases from external applications. A developer or administrator using the Sync Agent 1 to perform Synchronization for a collection of User Computers therefore uses a Database interface application of their choice to access and set up the Sync Agent's 1 internal profiles to instruct the Sync Agent 1 as to which Tables within which Databases to Synchronize, how often to do so, and with which Computer Users to exchange information. Once installed and operating on a User Computer, the Sync Agent 1 triggers its various subprogram processes according to its internal schedules table as set by the developer or administrator. Alternatively, the Sync Agent 1 can be set up to allow an individual User to trigger a desired subprogram of the Synchronization process on demand from within their Database application environment. This is generally accomplished by setting the Sync Agent 1 up to respond to external trigger commands as might be issued through the interface of another application program on the same computer using such standard cross application protocols as ODBC, Direct Data Exchange (DDE) or AppleEvents for the Macintosh platform.

Before the Synchronization process may be implemented across the Sharing Community, however, each Computer User within that community must initiate an Initialization 2 subprogram. In general, this subprogram uses information stored in a Send Sync Profile 4 and a Community Members Catalog 5 to create duplicate Record entries in a Duplicate Record Log 6. The Duplicate Record Log 6 entries identify the profile used to create the log entry, the Original Record and the Fields within the Record that are subject to Synchronization, and, in some instances, a version number. In the preferred embodiment, the Duplicate Record Log 6 is a single Database comprised of a single Database Table with columns for: Send Sync Profile ID, Version Date/Time, Record ID and Content. For each row in the Table, the Record ID column contains an XML-formatted block of text comprised of the content of all fields from an Original Record which are specified as part of the Primary Key for the Record. Additionally, for each row in the Table, the Content column contains an XML-formatted block of text comprised of the Content from all Fields in an Original Record, which are subject to Synchronization.

The Send Sync Profile 4 is used generally to identify each Database Table and its associated Records and Fields that are subject to Synchronization. The Profile 4 also identifies a Sync Computer that has the authority to resolve Synchronization conflicts, and to Synchronize Database Tables. Lastly, the Profile 4 specifies a Record Selection Criteria which establishes the criteria by which Original Records within a given Table are to be selected for Synchronization, according to the Profile 4. Preferably, the Record Selection Criteria comprises specific content within one or more Fields within a Record. For example, the State of "California" might be specified as the Record Selection Criteria with respect to a contacts table within a word processing program. In that case, all Original Records with the word "California" contained within the specified Field would be selected for Synchronization. In the preferred embodiment, the construction of the Send Sync Profile 4 and Receive Sync Profile 15 is assumed to be a one-time operation performed prior to deployment of the Sync Agent 1 to each User Computer throughout a network, and done so by a developer or administrator. However, in an alternate embodiment, where either the construction of Databases or the nature by which Records are shared, may change at least once after the Sync Agent 1 software is deployed, it would be necessary to facilitate the modification of the profiles on one or more User Computers. While the present invention does not inherently address this need, its acceptance of external access to and modification of the profiles through standard connectivity protocols, such as ODBC, supports manual steps or external subprograms to do so. For instance, an administration interface could be created as an external application, which would provide for the simple manual monitoring and modification of the profile data internal to the application. Additionally, such an application could monitor the error log produced by the present invention, and automatically create, modify or delete profiles as needed. Additionally, a simple application could be constructed to constantly rebuild the profiles of the invention using records in another Database, external to the invention, which itself is set up to be kept Synchronized by the invention, thereby establishing profile synchrony across a network of User Computers. The above are provided as examples, and not an exhaustive list, of ways in which the profiles of the invention can be made dynamic, rather than static, without effecting the successful use of the Sync Agent 1 software in a production environment.

The Community Members Catalog 5 identifies all User Computers within the Sharing Community. The Catalog 5 contains a Member ID, which is associated with each Computer User within the Sharing Community; a Member Address, which is the address of the User Computer, such as an email address; and a Keyword Listing, which is used to associate groups of Computer Users.

Once the initialization process has been completed by the Initialization 2 subprogram for all Database Tables that are subject to Synchronization, any subsequent modifications to an Original Record or Records within the Database Tables may be Synchronized with the same Original Record or Records contained within the Database Tables within the Sharing Community. The process of Synchronization may be initiated either by a Computer User who has made modifications to one or more Original Records within a Database Table, or it may be automatically initiated by the Sync Agent 1. If the process is to be initiated by the User, the User responds to an inquiry as to whether the User desires to Synchronize the modifications with the Sharing Community. On the other hand, if the Synchronization process is to be initiated automatically, Synchronization is performed at predetermined times (e.g., at midnight on Monday through Friday, or after a certain number of Original Records have been changed).

Regardless of the manner in which the Synchronization process is initiated, the process is initially controlled by a Sync Object Creator 3 subprogram. Referring now solely to FIG. 1A, this subprogram is responsible for creating a Sync Object 7 for each Original Record whose Fields have been changed, provided that the changed Fields are identified by the Send Sync Profile 4 as being the Fields that are subject to Synchronization. As will be discussed in more detail in connection with FIG. 5, each Sync Object 7 contains all of the information needed to similarly change or update the Corresponding Original Record contained within the Database Tables of other users within the Sharing Community. If a Sync Object 7 is created as the result of a modification to the Sync Record, then the Sync Object 7 contains information which causes it to be sent to all other User Computers within the Sharing Community. On the other hand, if the Sync Object 7 is not created due to a change in the Sync Record, then the Sync Object 7 is only sent to the Sync Computer.

As each Sync Object 7 is created it is stored in an Outbound Shuttle Log 8, and is addressed to the appropriate Computer User or Users within the Sharing Community. A Sync Object Sender 9 then sends each Log 8 entry or shuttle as an email attachment, to an email communications server, which ultimately sends each Sync Object 7 to the identified Computer User or Users.

Now, referring solely to FIG. 1B, the email communications server sends each email message, and each attached Sync Object 7, to each Computer User addressee within the Sharing Community. The email message is received by the Sync Object Receiver 10 subprogram which inserts each email message and its associated compressed and encrypted Sync Objects 7 into an Inbound Shuttle Log 11. A Sync Object Unpacker 12 unpacks and decodes each Sync Object 7 in the Log 11, and, as the Unpacker 12 does so, it utilizes at least one Receive Sync Profile 15 to determine if the Sync Object 7 should be added to a Sync Object Inbound Process Log 13. In general, the Receive Sync Profile 15 defines how to utilize Sync Objects 7 at a Remote Computer. This includes instructions regarding which Remote Table to update when a Sync Object 7 is received from a particular Local Table and how to utilize the Field content embedded in the Sync Object 7 with the Fields in the Remote Table.

Once each Sync Object 7 has been added to the Sync Object Inbound Process Log 13, a Sync Object Processor 14 determines, as to each Sync Object 7, whether it is associated with a Sync Record. If the Sync Object 7 is associated with the Sync Record, then the Sync Object 7 has been sent by the Sync Computer to a User Computer and changes in the Sync Record may be used to update the Corresponding Record within the User's Database Table. On the other hand, if the Sync Object 7 is not associated with the Sync Record, then the Sync Object 7 has been sent by a User Computer to a Sync Computer. In this case, changes in an Original Record by a User Computer may be used to update a Corresponding Record at the Sync Computer. This comparison and updating process will be more fully described in connection with FIGS. 8A and 8B through 8D

On the other hand, if the Sync Record was not modified by a User Computer which was not the Sync Computer (i.e., the Sync Object 7 was sent by a User Computer to the Sync Computer), then the Sync Object Processor 14 uses the Receive Sync Profile 15 to determine if the Sync Record's modification is accepted by the Sync Computer, and if so, the Sync Object 7 is similarly used to compare the modified Sync Record to the corresponding Original Record within the Remote Database Table, and to update the corresponding Record. In this manner, the modification to the Sync Record is effectively accepted by the Sync Computer, and the modified Sync Record is sent to all other Computer Users by the Sync Computer the next time the Sync Computer's Database is Synchronized.

Figure 1C:
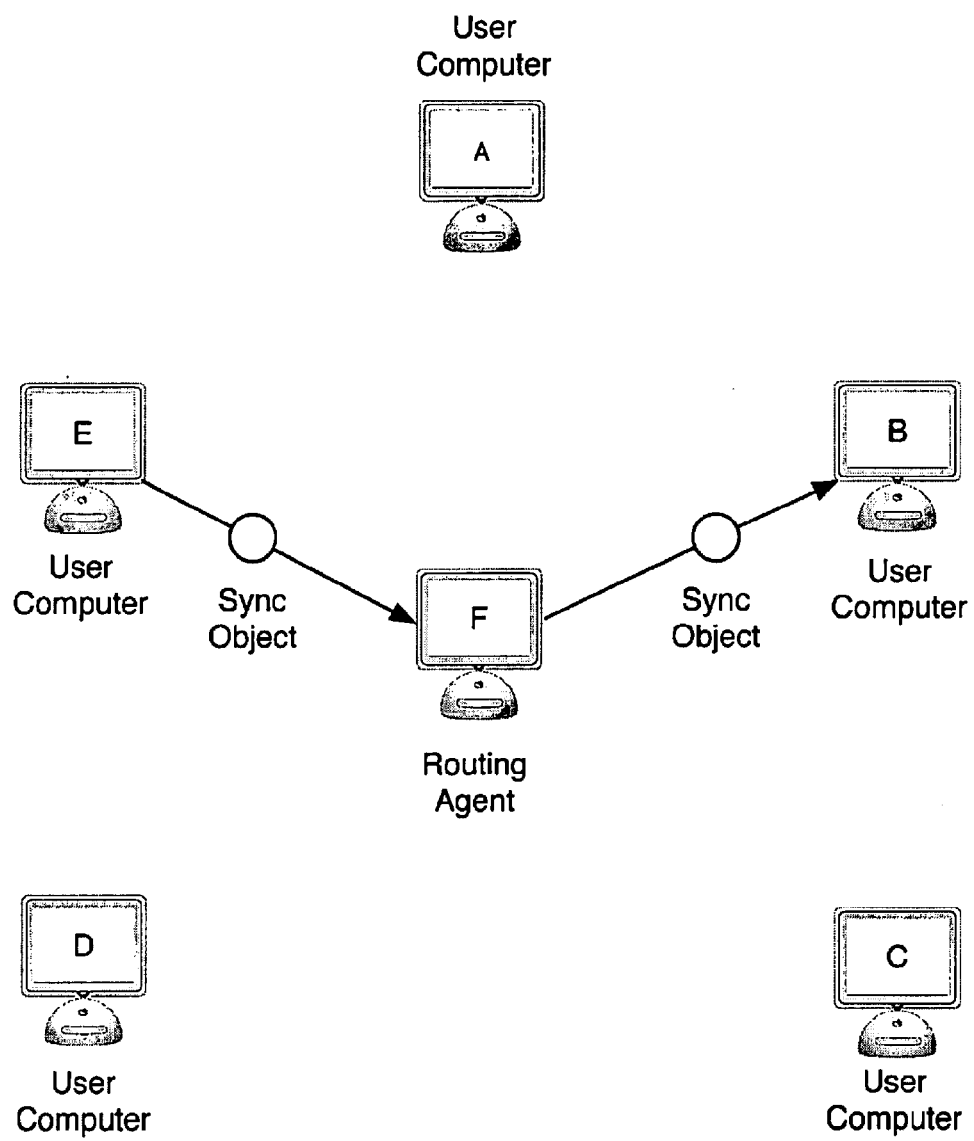
Figure 1D:
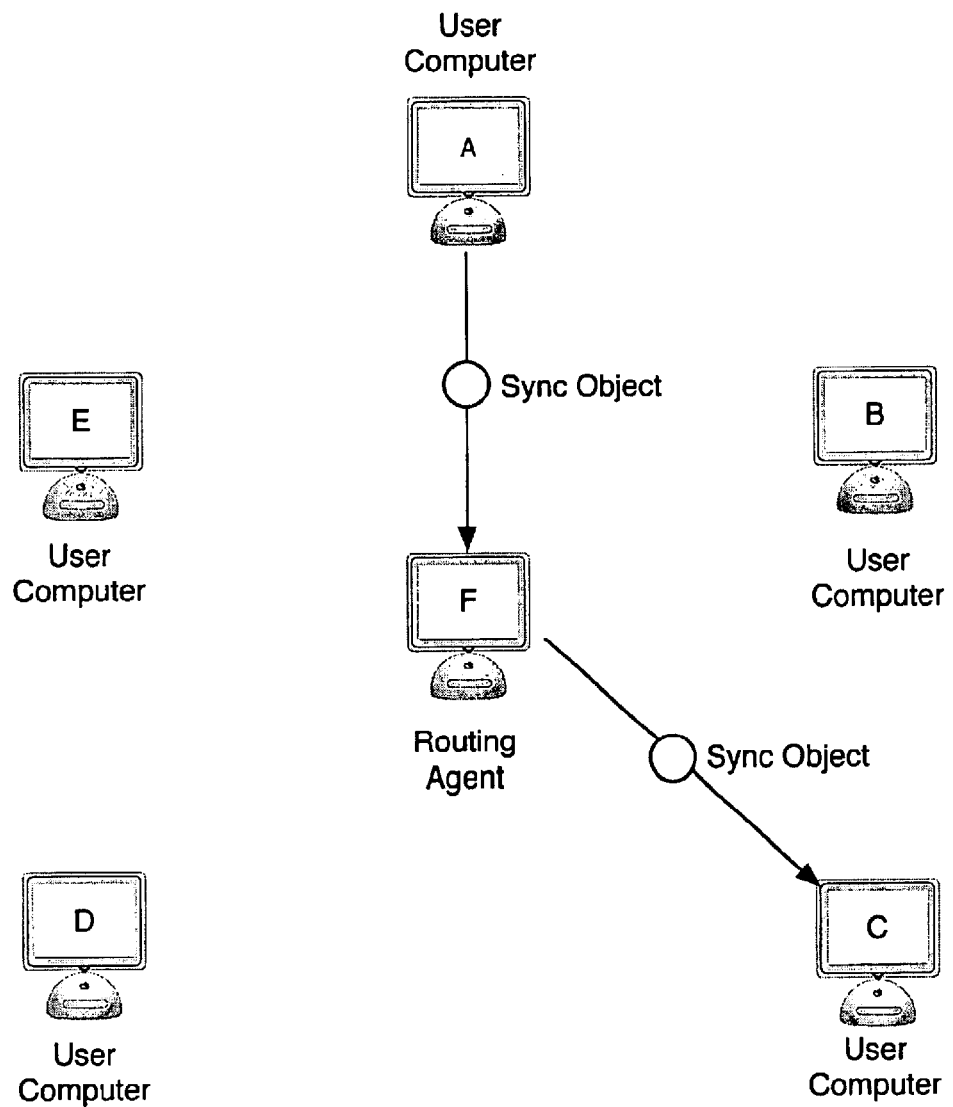

FIGS. 1C, 1D, 1E and 1F each display the same peer-to-peer network of User Computers with a routing agent, but each of the figures displays the network at a different time. Referring to FIG. 1C, User Computer E is shown submitting a Sync Object to the Sync Computer (User Computer B) regarding a requested Edit to an Original Record which will be identified hereafter as Original Record R1. The Sync Agent software on User Computer E detected a change in Original Record R1, created a Sync Object to reflect the change, and determined that the Sync Object needed to be addressed to User Computer B because the associated Send Sync Profile named User Computer E as the Sync Computer for Original Record R1. The Sync Object is first transmitted, at any time, from User Computer E to a routing agent computer, and from the routing agent to User Computer B at any time thereafter. Any number of routing agent machines may be included in this transmission exchange, although only one is depicted in the figure, as a means to provide load balancing in a high traffic network. It is not necessary for User Computer B to be accessible to the network when the Sync Object is transmitted from User Computer E to the routing agent. Nor is it necessary for User Computer E to be accessible to the network when the Sync Object is transmitted from the routing agent to User Computer B. Referring to FIG. 1D, after the Sync Computer received the Sync Object, it was used to update the Original Record R1 at User Computer B, which was determined to be the Sync Record. Subsequent to this update procedure, the Sync Agent at User Computer B determined that Original Record R1 had been Edited, and thereby created a Sync Object. Because the Send Sync Profile associated with Original Record R1 named User Computer B as the Sync Computer, the Sync Object was addressed to the Subscribers in the Sharing Community and is shown being transmitted first to a routing agent and secondly to each of the Subscribers for use in updating Corresponding Record R1. As with FIG. 1C, the transmission process can seen as two events, each of which may occur at any time.

Figure 1E:
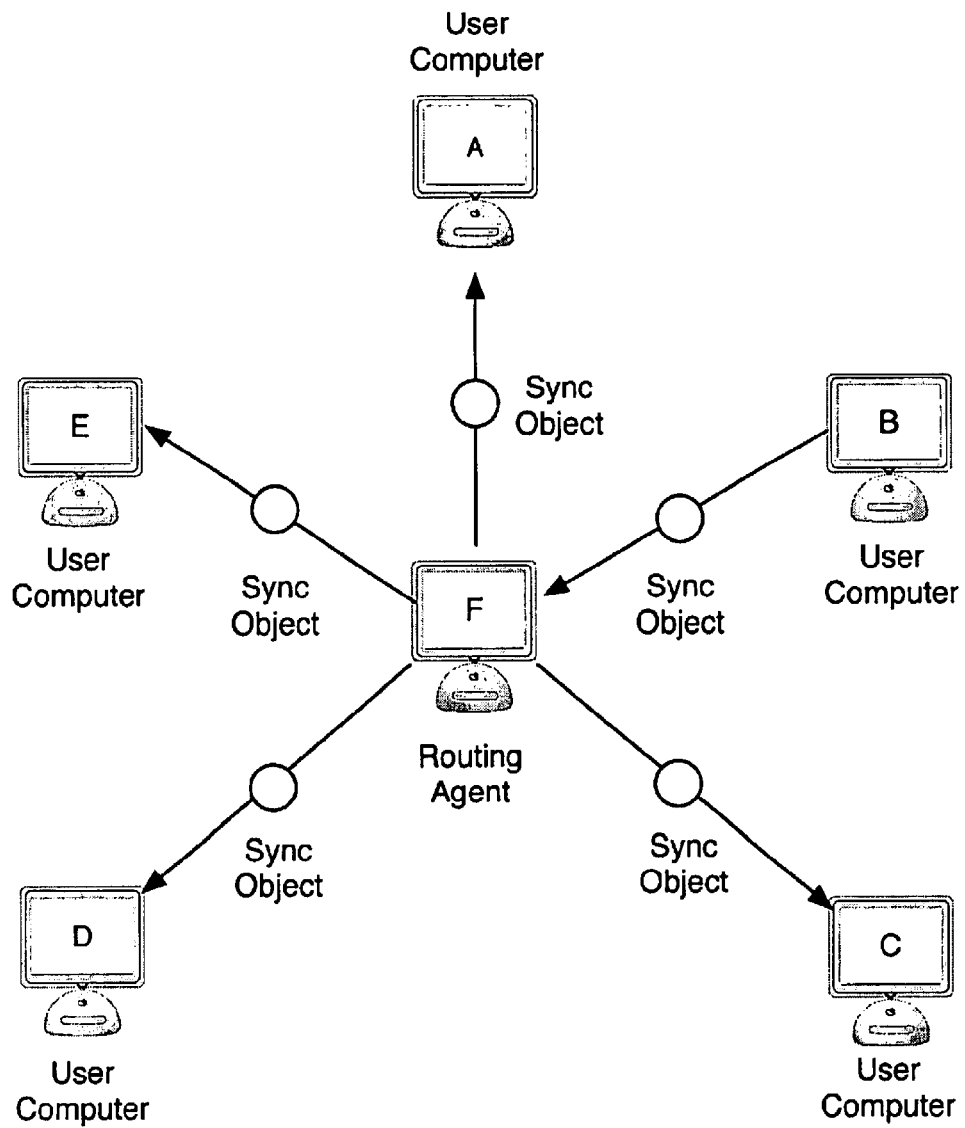
Figure 1F:
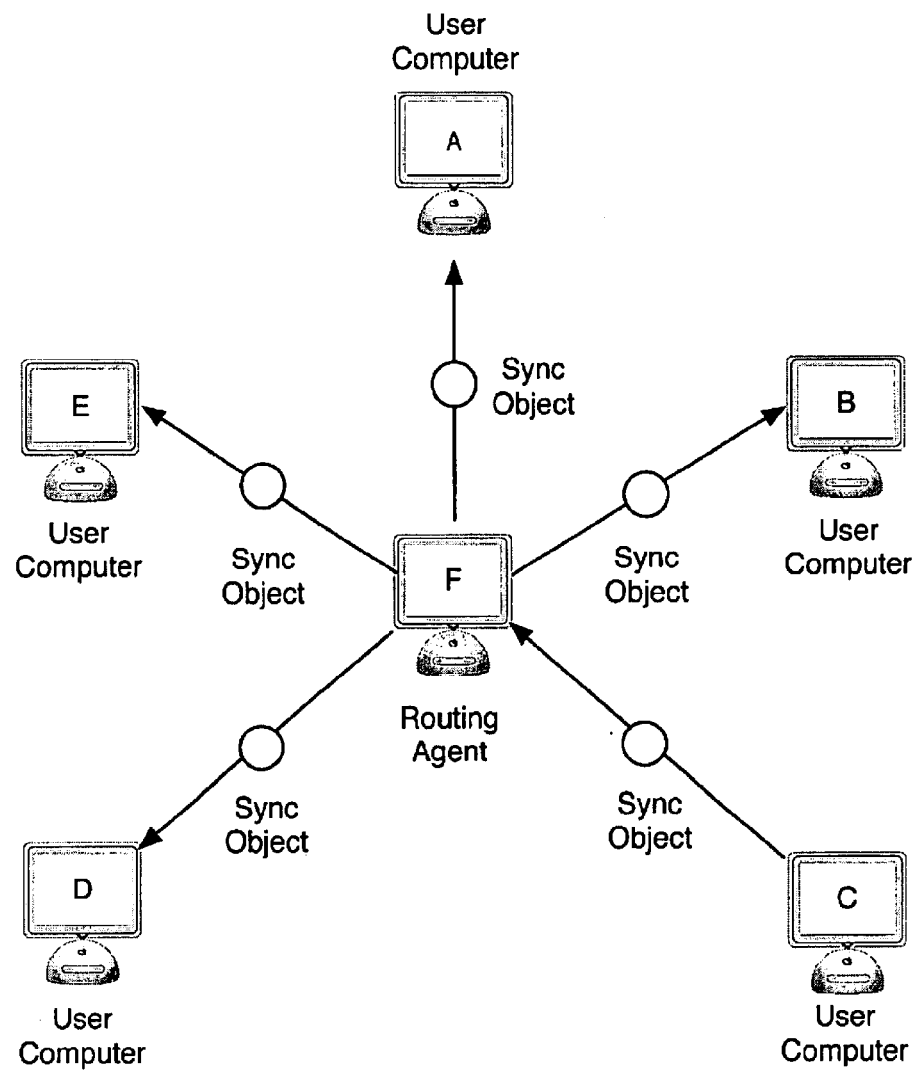

FIG. 1E and FIG. 1F follow the general logic of FIGS. 1C and 1D, respectively, but are related to a change made to Original Record R2, which is edited by User Computer A and which has a different Sync Computer than Original Record R1, namely User Computer C. Therefore, FIG. 1E illustrates that the Sync Object created by User Computer A is transmitted through the routing agent to User Computer C, the Sync Computer. Further, FIG. 1F illustrates that upon update of the Original Record R2 at the Sync Computer, and subsequent creation of a Sync Object, the Sync Object is transmitted from the Sync Computer to each of the User Computers in the Sharing Community to be used to update each Subscriber's Corresponding Record R2.

Figure 2A:
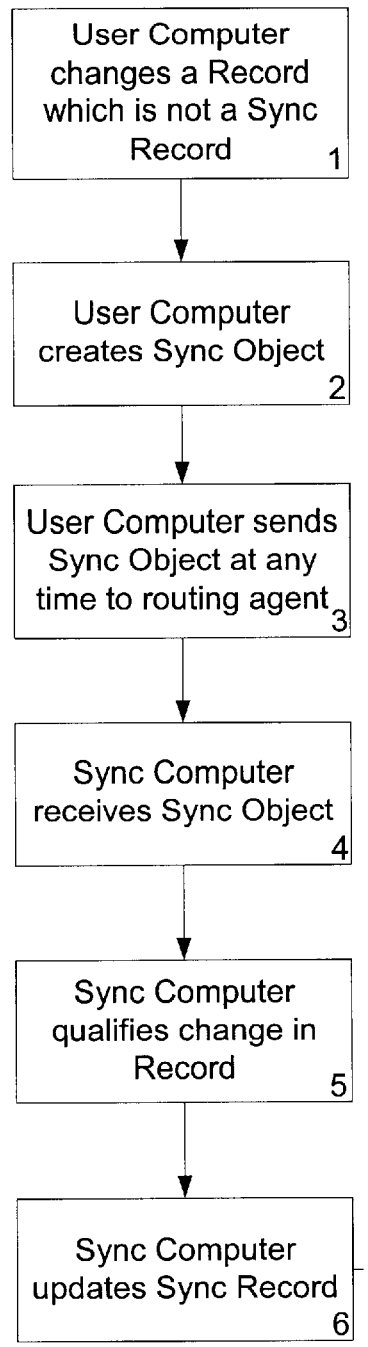
FIG. 2A is a flow chart illustrating the process of creating a Sync Object by sending it to a Sync Computer, and updating a Sync Record.
Figure 2B:
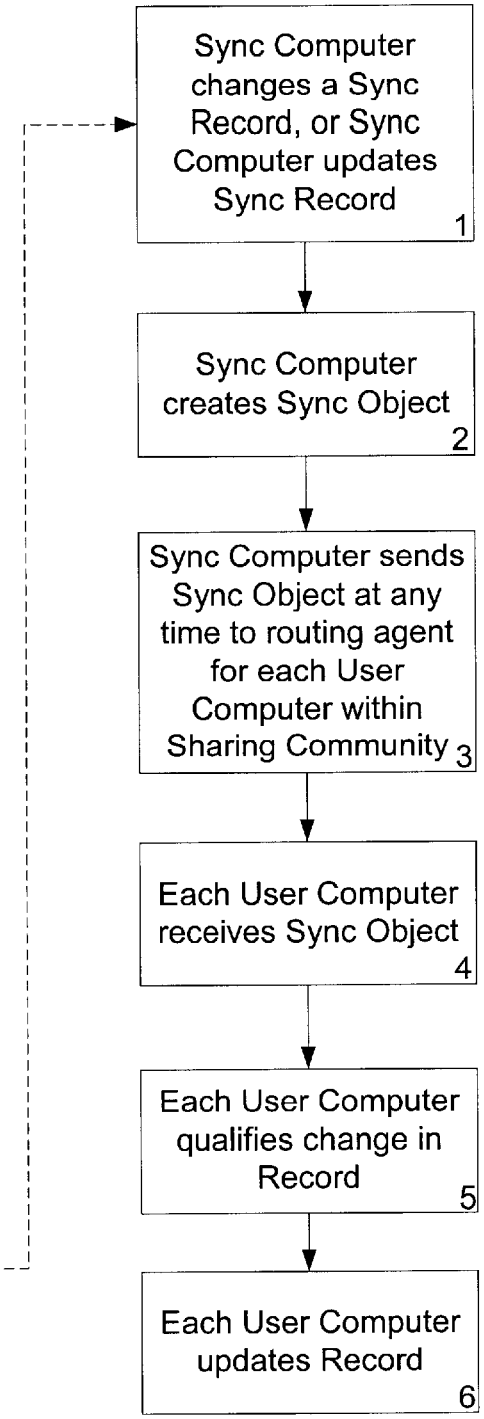
FIG. 2B is a flow chart illustrating the process of creating a Sync Object, sending it to a User Computer which is not a Sync Computer, and updating a Corresponding Record.

The flow charts depicted in FIGS. 2A and 2B generally illustrate the invention's process of database Synchronization using a Sync Object 7.

Referring first to FIG. 2A, at step 1, an Editor operating a User Computer makes a change in an Original Record, which is not the Sync Record. At step 2, the User Computer's Sync Object Creator 3 creates a Sync Object 7, which contains a "before" copy of the Original Record's Fields before the change and an "after" copy of the Original Record's Fields after the change. At step 3, the User Computer sends the Sync Object 7 to a routing agent for distribution to the Sync Computer. At step 4, the Sync Computer retrieves the Sync Object 7. At step 5, the Sync Computer's Sync Object Processor 14 qualifies the Editor's change in the Sync Record by resolving any conflict that may have arisen due to a change in the Sync Record at the Sync Computer which has occurred before the Editor's change is Synchronized. Finally, at step 6, if the change is qualified, the Sync Computer updates the Sync Record to reflect the Editor's change.

Referring next to FIG. 2B, at step 1, the Sync Record for the Sharing Community becomes modified. This could occur due to a change by an Editor at the Sync Computer, or due to an update performed on the record by the Sync Agent 1 as illustrated in the last step of FIG. 2A. In either case, the Sync Record associated with a Sync Computer has been changed in a Local Database. At step 2, a Sync Object 7 is created by the Sync Computer's Sync Object Creator 3, which contains "after" information about the change. At step 3, the Sync Object 7 is sent at any time to a routing agent for distribution to all other User Computers within the Sharing Community in order to potentially update their Remote Database Tables. At step 4, each User Computer within the Sharing Community retrieves the Sync Object 7 at any time after the Sync Object 7 was sent to the routing agent. At step 5, each User Computer qualifies the Sync Object 7 to make sure that the Sync Object 7 is coming from the Sync Computer and contains the most recent version of the Sync Record. Lastly, at step 6, each User Computer updates the corresponding Record.

The flow charts set forth in FIGS. 3A through 10 illustrate, in additional detail, the Sync Agent 1 program and its subprograms, and the manner in which the subprograms process the data and information of the present invention in order to Synchronize the Databases of the Sharing Community.

Figure 3A:
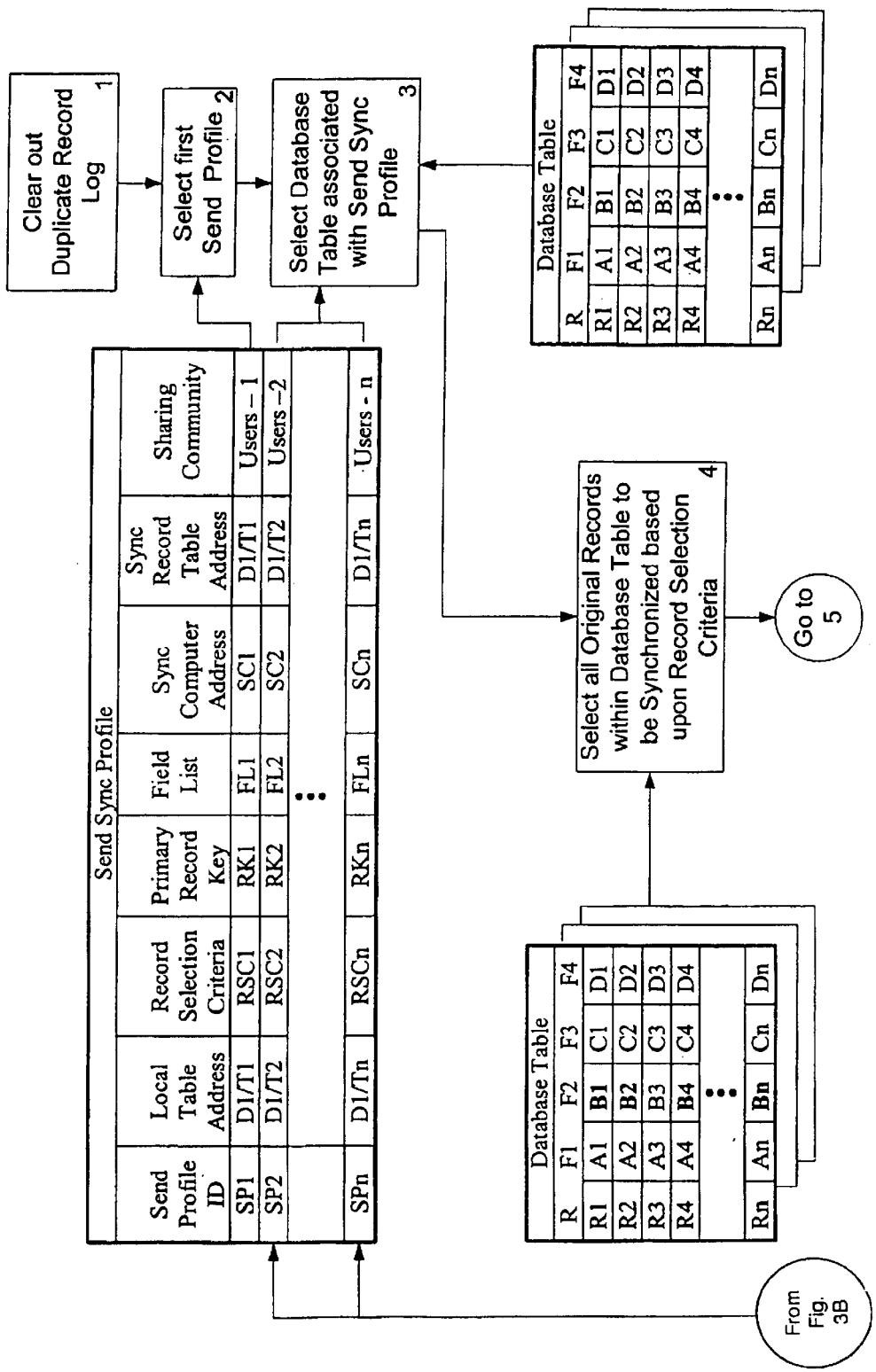
FIGS. 3A and 3B are flow charts illustrating the Initialization subprogram process.
Figure 3B:
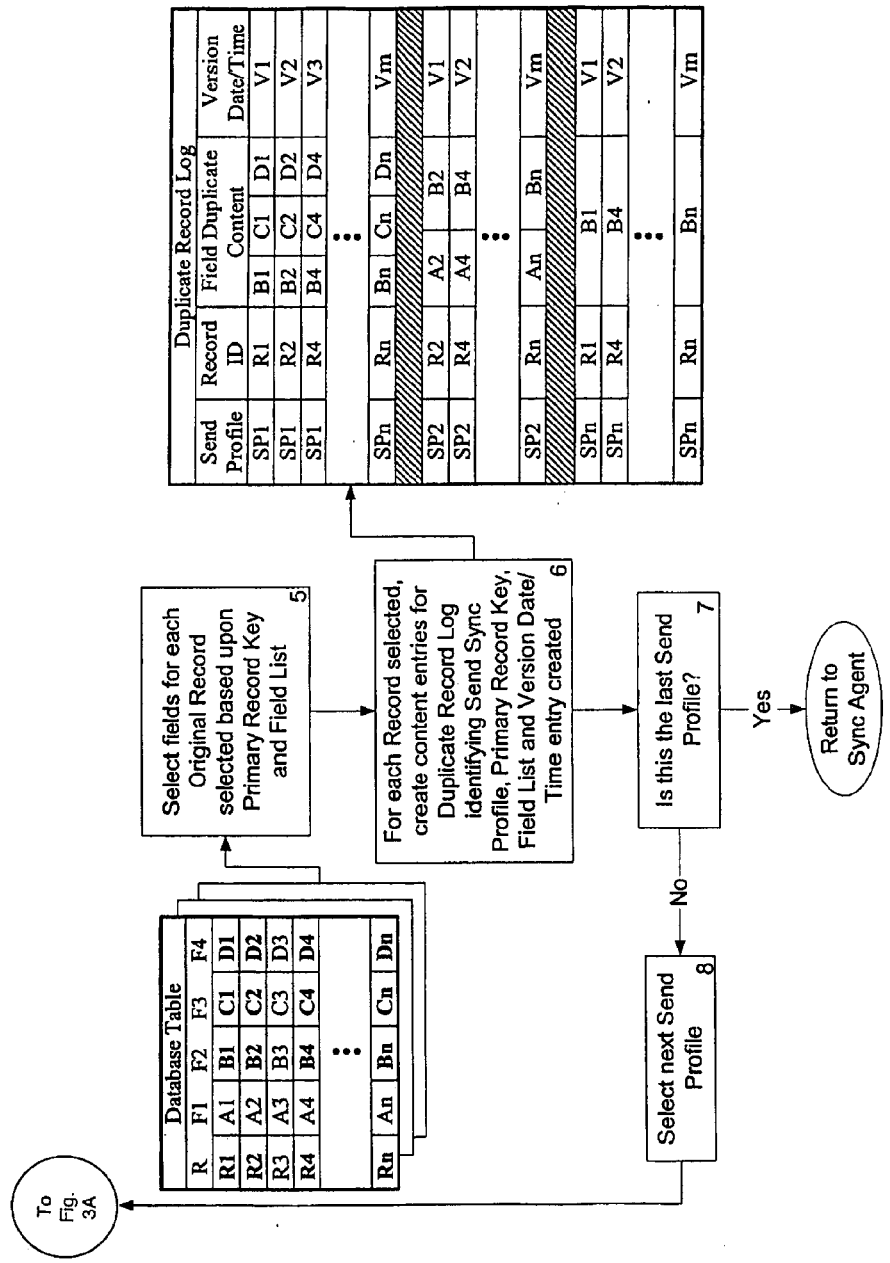

FIGS. 3A and 3B describe the Initialization 2 subprogram. At step 1, all entries in the Duplicate Record Log 6 are erased and cleared from memory. At step 2, the subprogram accesses the Send Sync Profile 4 and selects a first Send Profile (SP1), out of a plurality of Profiles identified as SP1, SP2 . . . SPn. Each Profile is associated with a Database Table Address which identifies the Database Table, out of a plurality of Database Tables, that is subject to Synchronization. These database tables are illustrated in the figure as D1/T1, D1/T2, . . . D1/Tn, and the first Send Profile (SP1) is associated with the first Database Table (D1/T1). Also associated with each Send Profile is a Record Selection criteria: RSC1, RSC2 . . . RSCn. The Record Selection Criteria is utilized by the invention to identify the Original Records within a Database Table that are subject to Synchronization. Although several different schemes are possible, in a preferred embodiment the Record Selection Criteria comprises a selection query regarding the content of one or more Fields within each Record (e.g., all Records containing the Field content "John Smith" in the Field "Sales Representatives"). The Send Profile further specifies a Primary Record Key and a Field List which together identify all of the Fields within each Database Table that are subject to Synchronization. In the figure, the Primary Record Key PK1 represents the Fields within each Record that constitute the Record's unique identification, and FL1 represents the Fields within each Record that may be Synchronized. The Send Profile also specifies a Sync Computer Address which is associated with the Profile. The Sync Computer Address comprises the address of the User Computer which has the authority over the Sync Records selected by the Profile 4. This includes the authority to resolve conflicting changes to Sync Records and corresponding Records and to identify the User Computers within the Sharing Community that are to receive the changes. In a preferred embodiment, the address of the Sync Computer is the computer's email address, which is illustrated in the figures, SC1, SC2 . . . SCn. The designation of Sync Computer can be fixed in the Profile 4 as being a single computer in the Sharing Community for all effected Original Records, or it can be the name of a Field in the effected table which will contain this information on a record-level basis. The Sync Record Table Address, repeated as D1/T1, D1/T2 . . . D1/Tn, refers to the Table in the memory of the Sync Computer, which contains the Sync Record. Accordingly, each Send Profile within the Send Sync Profile 4 identifies the User Computer Address of a Database Table (i.e., Local Table Address) that is subject to Synchronization, and each provides a method for identifying each Original Record, and the Fields within each Original Record, that are subject to Synchronization. Finally, the Send Profile identifies the User Computers within the Sharing Community that are to receive Sync Objects 7 to be used to Synchronize their Database Records. The Computer Users are illustrated in the figure as Users 1, Users 2 . . . Users n. Preferably, the Computer Users associated with each Send Profile are a specific list of Computer Users. Alternatively, the Computer Users may be identified by a key word, such as <ALL>, which associates all users within the Profile 4. Another technique is to identify Computer Users by a reference to a specific Field within an Original Record.

At step 3, the Initialization 2 subprogram selects the Database Table associated with the Send Sync Profile 4. In the figure, the first Send Profile (SP1) selects the first Database Table (D1/T1), which is illustrated as having R1, R2, R4 . . . Rn Records and each Record has R, F1, F2, F3 and F4 Fields; Field R contains content or values R1 through Rn; Field F1 contains content or values A1 through An; Field F2 contains B1 through Bn; Field F3 contains C1 through Cn; and Field F4 contains D1 through Dn.

At step 4, the Initialization 2 subprogram selects all Original Records within the Database Table to be Synchronized based upon the Record Selection Criteria specified by the Send Sync Profile 4. The figure illustrates that the Record Selection Criteria for the first Send Profile (SP1) is a selection criteria represented as RSC1, which selects those Records whose Field F2 has contents of B1, B2, B4 . . . Bn. Thus, all Records which have satisfied the identified criteria are selected for Synchronization.

At step 5, the Initialization 2 subprogram selects Fields for each Record selected at step 4 that are to be Synchronized based upon the Primary Record Key and the Field List identified for each Record within the Send Sync Profile 4. In the example illustrated in the figure, Fields R, F2, F3 and F4 are selected.

Next, at step 6, for each Original Record selected at step 4, the Initialization 2 subprogram creates entries in the Duplicate Record Log 6, associated with each Original Record selected, identifying the Send Profile, Primary Record Key, Field Content, and Version Date/Time. In the figure, Records R1 through Rn have been selected, utilizing the criteria established by the first Send Sync Object Profile (SP1). As will be described below, the Duplicate Record Log 6 is used to create a Sync Object 7 for each Log 6 entry. In this regard, the Field Content entry contains a duplicate copy of the original Fields from the Original Record contained within the Database Table, and the Field Content entry constitutes the state of the Record "before" any charges are made to the Fields within the Original Record within the Database Table. When changes are made to the corresponding Fields within the Original Record after the duplicate Field content is created in the Duplicate Record Log 6, the Original Record content is referred to as the state of the Record "after" the changes.

The Version Date/Time entry within the Duplicate Record Log 6 refers to the date and time a Sync Computer creates a duplicate entry of a Sync Record associated with said Sync Computer. In the figure, the date and time represented as V1, V2, V3 and Vn are respectively associated with Records R1, R2, R4 and Rn.

At step 7, the Initialization 2 subprogram determines whether the Send Profile just processed is the last profile within the Send Sync Profile 4. If it is the last profile, initialization is completed and control is returned to the Sync Agent 1. If it is not the last profile, at step 8, the subprogram selects the next Send Profile applicable to the next Database Table, and repeats steps 3 through 7. This looping process is continued until all Profiles have been used to identify all Original Records within each Database Table that are to be Synchronized.

Figure 4A:
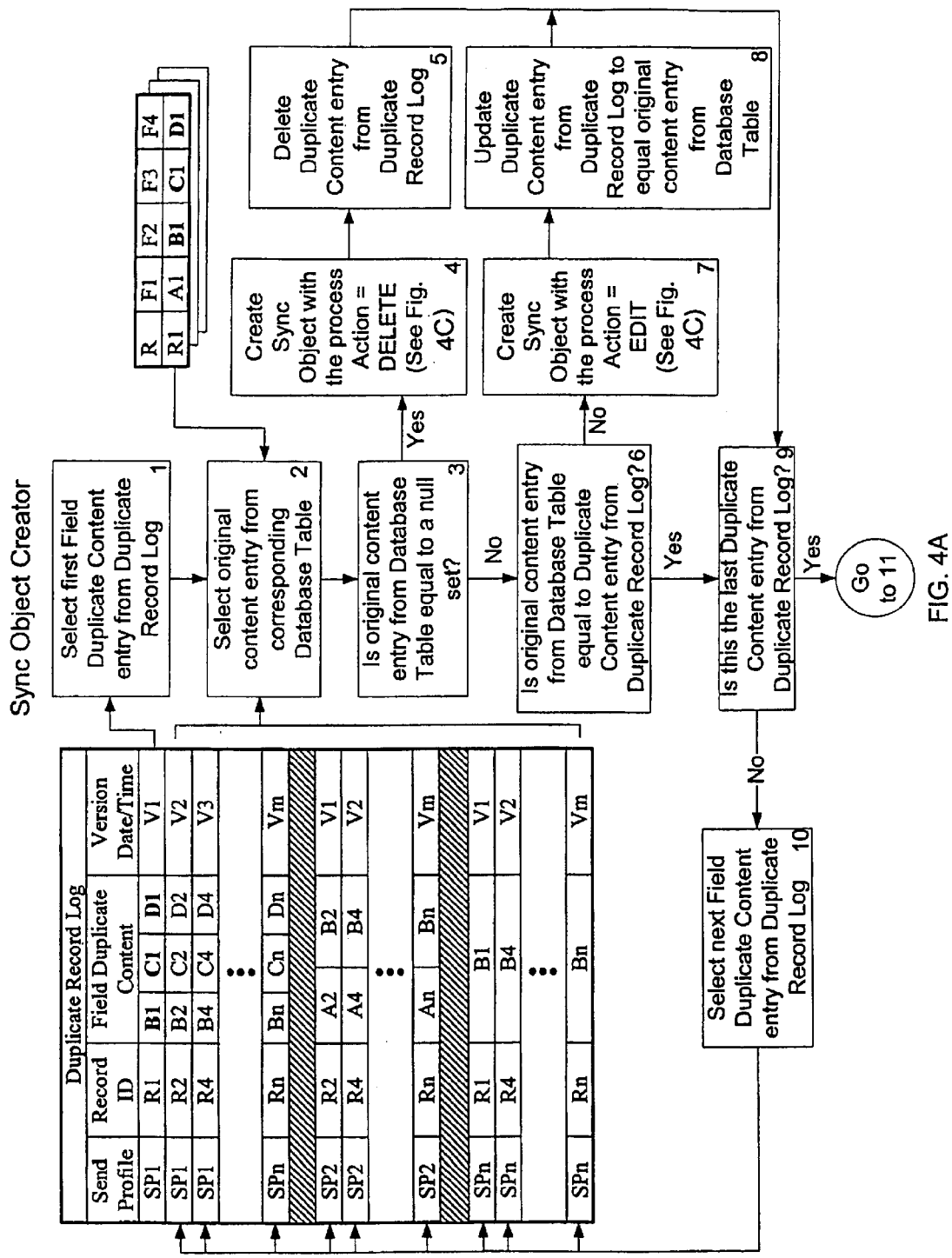

Once the initialization process is completed, the Sync Agent 1 is able, at any time, to initiate the Sync Object Creator 3 subprogram in order to capture changes to Original Records that have occurred since the last Synchronization. This process, which is illustrated by the flow chart in FIGS. 4A and 4B, is controlled by the Sync Object Creator 3, which creates a Sync Object 7 associated with each change in an Original Record after Initialization 2 or after the last Synchronization. Steps 1 through 9 in FIG. 4A describe the process of detecting a change in an Original Record within a Database Table and identifying whether the Original Record has been modified or deleted.

At step 1, the Sync Object Creator 3 selects the Field Duplicate Content containing the first duplicate content entry from the first Duplicate Record Log 6 entry. At step 2, the Sync Object Creator 3 selects the original content entry from the corresponding Original Record within the Database Table. In the figure, these two steps are illustrated by selecting Field Duplicate Content, B1 C1 D1, from the first Duplicate Record Log 6 entry associated with Record R1 and by selecting the corresponding Original Record content B1 C1 D1, from the Database Table. For the purpose of illustrating these steps, it is assumed that the Original Record content, B1 C1 D1, has been either modified or deleted.

At step 3, the Sync Object Creator 3 determines whether the Original Record's original content has been deleted (i.e., equals a "null" set). If a null set is found, control passes to step 4 where a Sync Object 7 is created based upon the fact that an "Action" has deleted ("Action=Delete") the content from the Original Record. The Sync Object 7 creation process is described in detail below with respect to FIGS. 4C and D. Continuing at step 5, the duplicate content entry is deleted from the Duplicate Record Log 6 so that the Original Record contents and duplicate Record contents are once again the same. At step 9, the Sync Object Creator 3 determines if the duplicate Record content is the last entry in the Duplicate Record Log 6. If it Fis the last entry, control passes to step 11. If it is not the last entry, the process continues at step 10 where the next duplicate Record content entry is selected. In the figure, this selection is shown by selecting the Field Content associated with Send Profile SP1 and Record R2. The looping process continues between steps 2 and 9 until all duplicate Record contents have been selected and compared to their corresponding Original Record contents.

Returning to step 3, if the Original Record content is not a null set, the process continues to step 6 where it is determined if the Original Record entry from the Database Table is the same as or is equal to the duplicate content entry from the Duplicate Record Log 6. If the two contents are not the same, this means that the Original Record's contents have been modified. Control passes to step 7 where a Sync Object 7 is created upon the fact that an "Action" has modified or edited ("Action=Edit") the Original Record. This Sync Object 7 creation process is also described below with respect to FIGS. 4C and D. At step 8, the duplicate Record content entry from the Duplicate Record Log 6 is updated to match the Original Record content from the Database Table which has been edited. Finally, again at step 9, it is determined if any more duplicate Record entries exist.

In steps 11 through 19 in FIG. 4B, the Sync Object Creator 3 determines if any new Original Records have been added to the Database Table, and if so, whether the Records that have been added should be Synchronized in accordance with the Send Sync Profile 4. At step 11, the Sync Object Creator 3 selects the first Send Profile from the Send Sync Profile 4. Then at step 12, based upon the Sync Record Selection Criteria specified by the Profile, all Sync Records within the Database Table to be Synchronized are selected. In the figure, Records R1, R2, R4 and Rn are selected. At step 13, the first Original Record is selected. In the figure, this selection is illustrated as Record R1, combining Field content, A1 B1 C1 D1.

At step 14, the Sync Object Creator 3 determines if the Original Record has a corresponding duplicate Record in the Duplicate Record Log 6. If the answer is "no," then at step 15 the Sync Object Creator 3 creates a Sync Object 7 for the new Record utilizing the process where "Action=NEW," which is described in connection with FIGS. 4C and D. At step 16 a duplicate copy of the Original Record is added to the Duplicate Record Log 6 so that future changes to the Record may be Synchronized. If, on the other hand, the answer at step 14 is "yes," there is a match between the Original Record and the duplicate Record, then at step 17, the Sync Object Creator 3 determines if the Original Record is the last Record to be Synchronized based on the Sync Profile. If it is not the last Original Record, at step 18, the next Original Record is selected. This loop continues until all Original Records, R1 through Rn, have been selected. If at step 17 it is determined that the Original Record is the last record, then at step 19 it is determined whether the Sync Profile is the last profile. If it is not, then at step 20 the next Sync Profile is selected and steps 11 through 19 are repeated. If it is the last Sync Profile, then the Sync Object Creator 3 returns control to the Sync Agent 1.

Figure 4C:
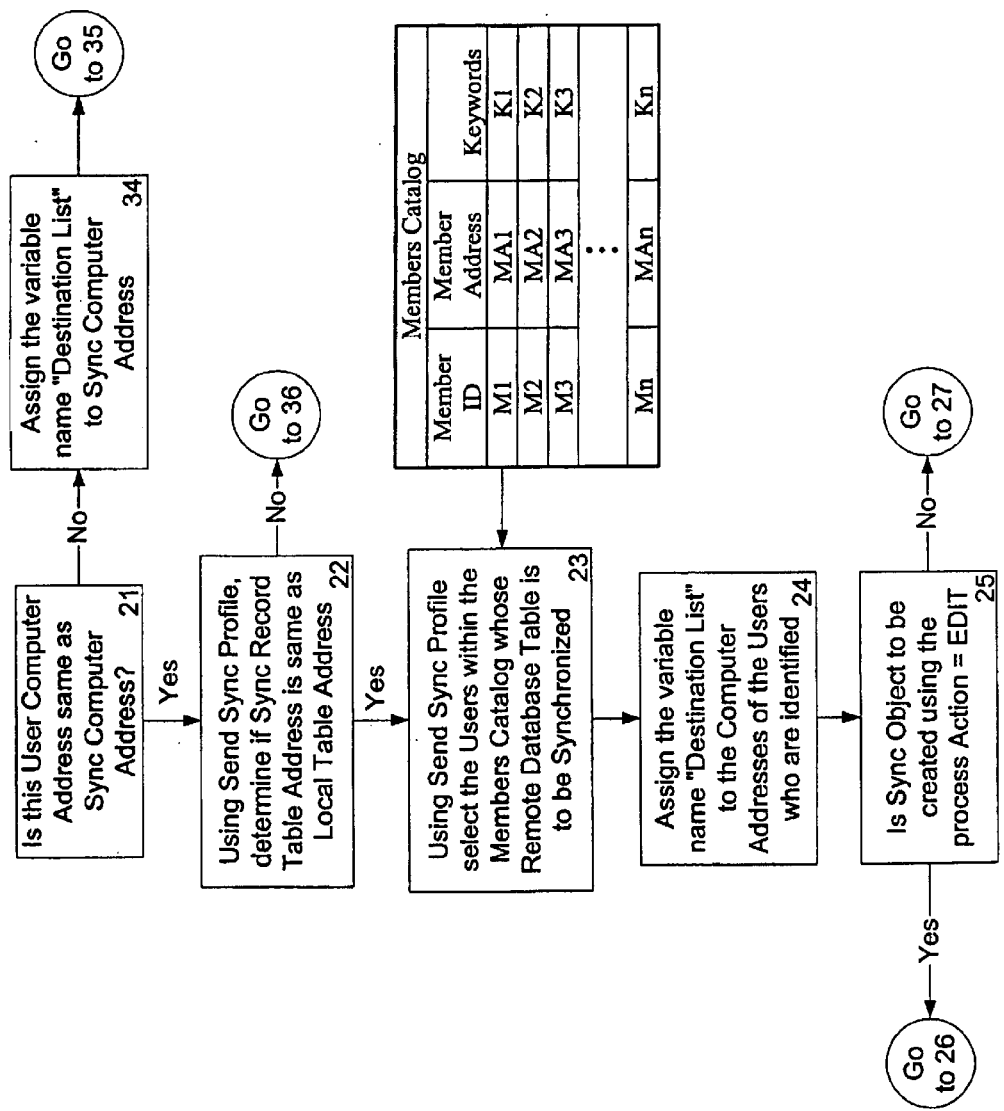
FIGS. 4C and 4D are flow charts illustrating the creation of a Sync Object.
Figure 4D:
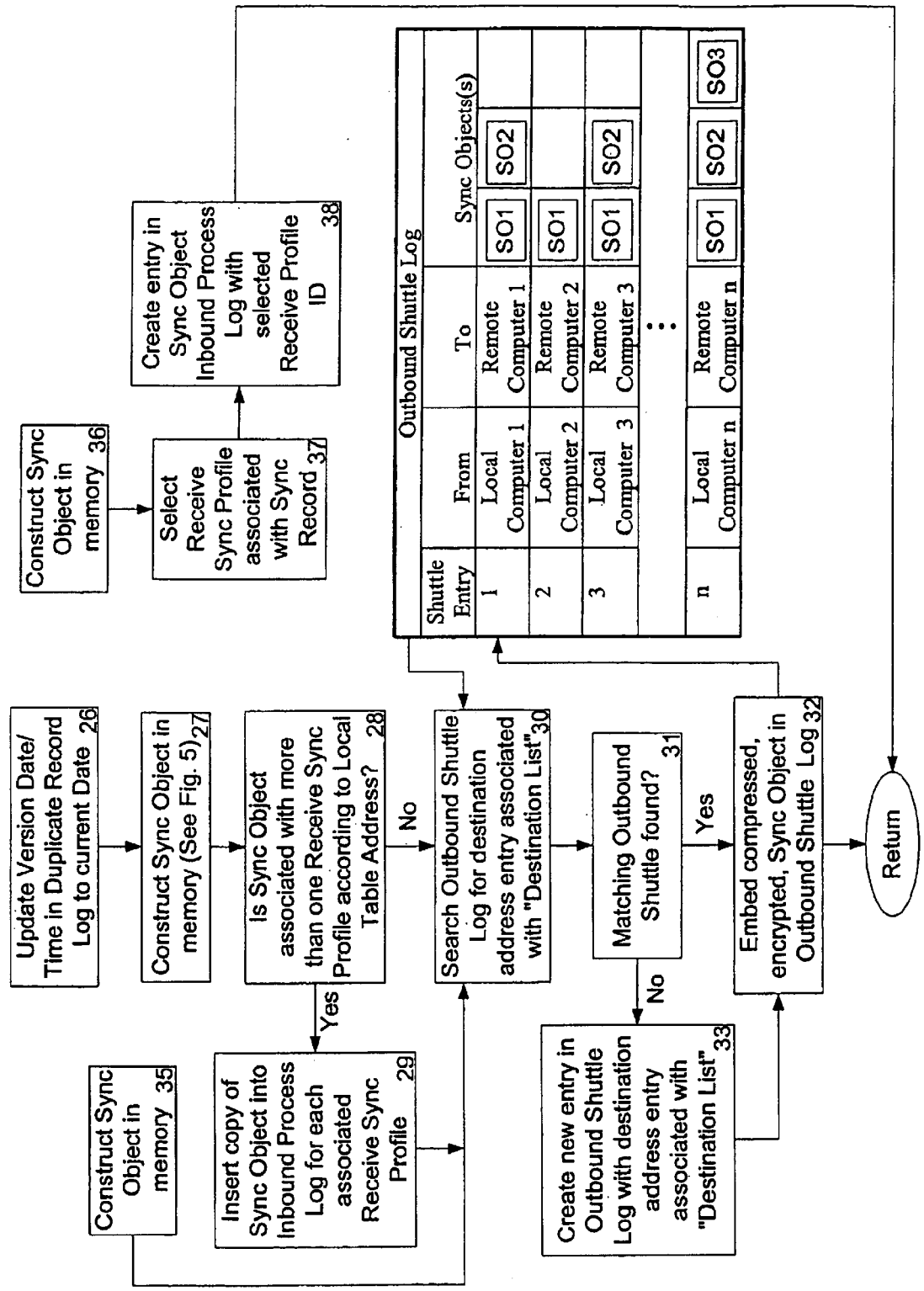

FIGS. 4C and 4D presents the steps involved in creating a Sync Object 7 and adding it to the Outbound Shuttle Log 8. This process is performed within the process described in FIGS. 4A and 4B at steps 4, 7 and 15, respectively. At step 21, the Sync Object Creator 3 determines if the Computer User who has made a change to the Original Record is operating the Sync Computer (i.e., Sync Computer is associated with the Sync Record). If the Computer User is operating the Sync Computer, then at step 22 it is determined, by using the Send Sync Profile 4, if the Original Record, which was modified, is the Sync Record, by comparing the Sync Record Table Address to the Local Table Address of the Original Record. If the answer is "yes," then at step 23 the Sync Object Creator 3 utilizes the Sharing Community definition of the Send Profile to identify the Computer Users within the Sharing Community whose Database Table is to be Synchronized. At step 24, the variable name "Destination List" is assigned to the Computer Users who are identified.

At step 25, the Sync Object Creator 3 determines if the Original Record has been edited, rather than deleted or added as a new record. If the Original Record has been edited (i.e., "Action=EDIT"), then at step 26, the Version Date/Time Field in the Duplicate Record Log 6 is updated to the current date and time to reflect the date and time the Duplicate Record Log 6 entry was made.

Finally, at step 27, the Sync Object 7 is constructed and stored in memory. An example of a Sync Object 7 is illustrated in FIG. 5, and will be discussed in more detail below.

At step 28, the Sync Object Creator 3 determines if the Sync Object 7 is associated with more than one Receive Sync Profile 15. This step is necessary in order to determine if the Original Record is found in more than one Database Table. If the answer is "yes," at step 29, a copy of the Sync Object 7 is inserted into the Inbound Process Log 13, for each Receive Sync Profile 15 selected. Then at step 30, the Sync Object Creator 3 searches the Outbound Shuttle Log 8 for a destination address entry associated with the "Destination List." If at step 31 a match is found, then at step 32 the Sync Object 7 is compressed, encrypted and embedded in an Outbound Shuttle Log 8 entry. If no match is found, a new entry in the Outbound Shuttle Log 8 is created at step 33, with a destination address associated with "Destination List," and control passes to step 32.

Returning to step 21, if it is determined that the Computer User is not operating the Sync Computer, then at step 34, the variable name "Destination List" is assigned to the address of the Sync Computer, and at step 35, a Sync Object 7 is created and stored in memory. Then, control passes to steps 30, 31 and 32 or to 30, 31, 33, and 32 as described above. Once all Sync Objects 7 have been added to the Outbound Shuttle Log 8 at step 32, control is returned from the Sync Object Creator 3 back to the Sync Agent 1.

Finally, returning to step 22, if the Original Computer is not determined to be the Sync Record, a Sync Object 7 is constructed at step 36 and stored in memory. At step 37, the Sync Object Creator 3 selects the Receive Sync Profile 15 whose Remote Table Address is associated with the Sync Record Table Address, and at step 38, a Sync Object 7 entry is created in Sync Object Inbound Process Log 13 with the selected Received Profile. Control is then returned to the Sync Object Creator 3 where the process described in FIGS. 4A and 4B are continued.

Figure 9:
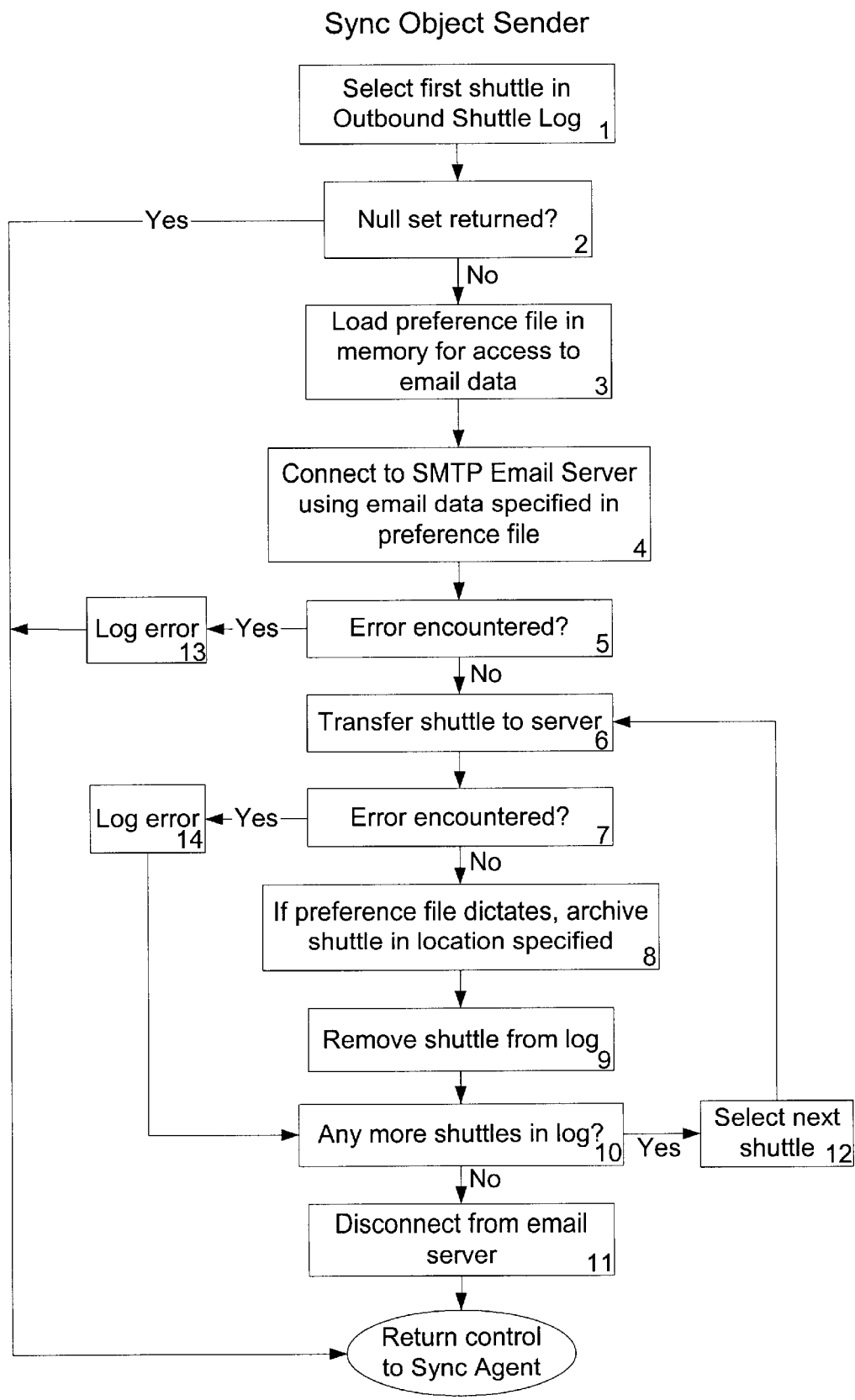
FIG. 9 is a flow chart illustrating the Sync Object Sender.
Figure 10:
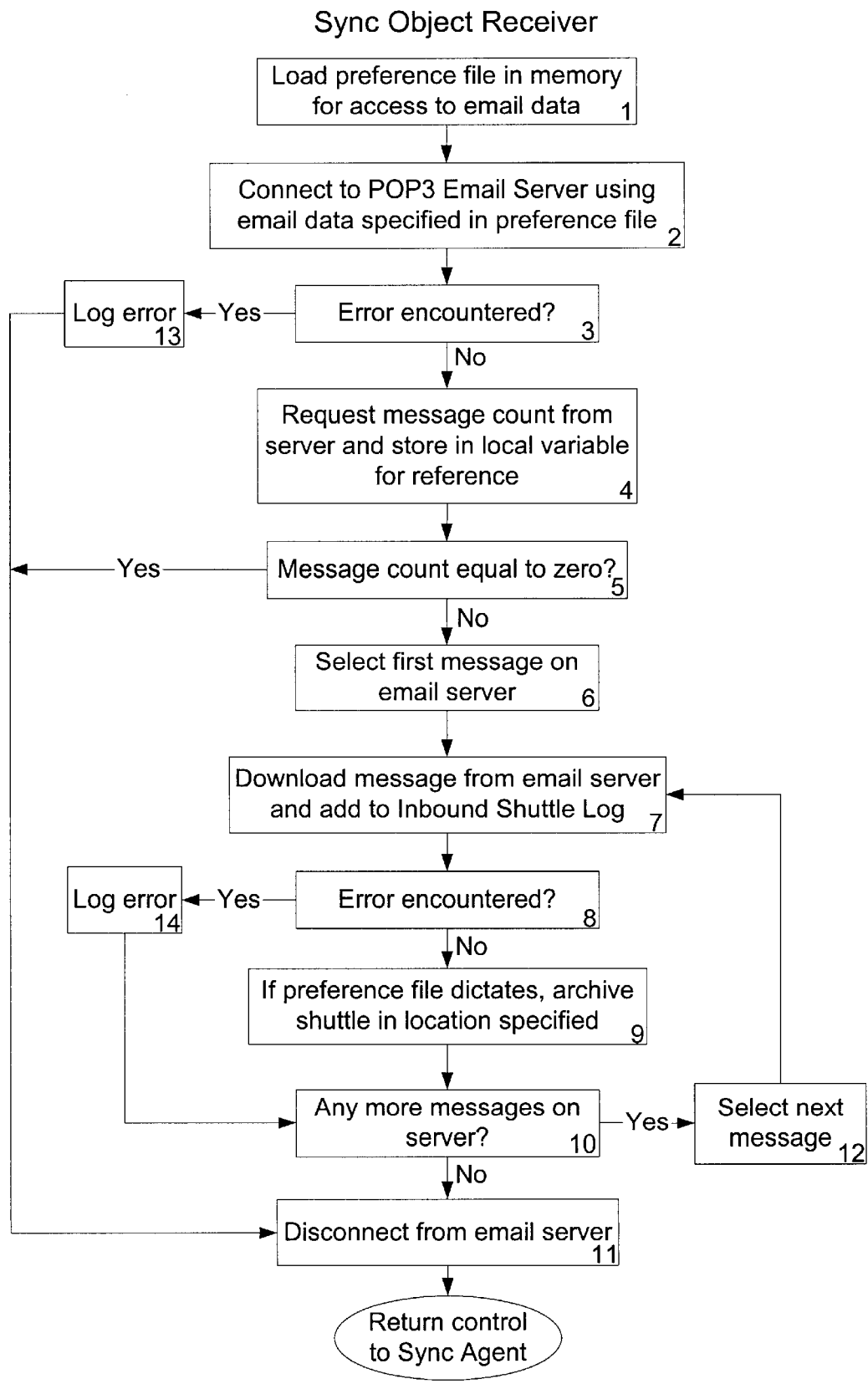
FIG. 10 is a flow chart illustrating the Sync Object Receiver.

FIG. 5 describes the content of a Sync Object, which is always created by the process in FIGS. 4C and D at a Local Computer and used by the processes described in FIGS. 6A through C, 8A, and 8B through 8E at a Remote Computer. The Sync Object 7 contains a Sync Computer Address, which in the preferred embodiment is an email address. The Sync Computer Address specifies the address associated with the User Computer, which contains the Sync Record for the Sharing Community. The Sync Object 7 also contains the Sync Record Table Address, which is the address associated with the location on the Sync Computer of the table which contains the Sync Record for the Sharing Community. Both the Sync Computer Address and Sync Record Table Address are defined in the Send Sync Profile which is used to create the Sync Object 7. The Sync Object 7 also contains a Version Date/Time that the Duplicate Record in the Duplicate Record Log 6 which corresponds to the Sync Record was last updated by the Sync Record. This operation is performed in the subprogram outlined in FIGS. 4A and 4B during the creation of a Sync Object 7 regarding a New, Edit or Delete operation. The Sync Object 7 additionally contains a Sync Object ID, which is a randomly assigned identification number issued at the time of the creation of the Sync Object 7 and is used by the invention to reference Sync Objects 7 during various processes. The Sync Object 7 contains an Action, which describes what operation was performed on the Original Record at a Local Computer. The Sync Object 7 also contains an Editor Computer Address, which is an email address in the preferred embodiment. This address designates the address associated with the User Computer at which the Sync Object 7 was created. Additionally, the Sync Object 7 contains an Editor Table Address, which is the address within the User Computer which created the Sync Object 7 of the Database Table from which an Original Record was either created, changed or deleted. The Date and Time that the Sync Object 7 was created at the Local Computer is also recorded in the Sync Object 7, as is the size of the Sync Object 7. The Sync Object 7 also contains the Primary Key Definition and Record ID of the Original Record. The Primary Key Definition, pulled from the Send Sync Profile, specifies the Fields from the Original Record which are used to designate the Original Record. The Record ID is the content of the Primary Key fields from the Original Record. The Sync Object contains a Field List from the Send Sync Profile of the field names from the Original Record which are subject to Synchronization. The Sync Object also contains the content of Fields "before" modification, which is derived from the Duplicate Record Log entry associated with the Original Record. Lastly, the Sync Object contains the content of Fields "after" modification, which is derived from the Synchronized Fields of the Original Record, which are subject to Synchronization. The Outbound Shuttle Log 8 contains individual entries, each of which are intended to be individually transmitted to the Inbound Shuttle Log 11 of at least one Remote User Computer. The method of transmission may be accomplished according to any medium which enables the eventual distribution of an Outbound Shuttle Log 8 entry to the Inbound Shuttle Log 11 of each of its intended recipients. Eventual is used here to make clear that the time between the creation of an Outbound Shuttle Log 8 entry and its receipt into the Inbound Shuttle Log 11 of an intended recipient is immaterial to the functioning of the invention. In the preferred embodiment, this transmission is accomplished using at least one intermediary routing agent where the process of transmitting each Outbound Shuttle 8 entry from a Local Computer to its intended recipient(s) entails first transmitting the entry to a routing agent where the entry is then transmitted to each intended recipient. Additionally, in the preferred embodiment, the act of transmitting the entry to each intended recipient entails establishing a holding location or "Inbox" for each User Computer on a computer which is accessible at all times to the routing agent and from which the entry may be transmitted at any time to its intended User Computer when the User Computer is available for connection to the routing agent. The means by which an entry is transmitted from the Outbound Shuttle Log 8 of a User Computer to a routing agent may be accomplished by the Sync Agent 1 of the User Computer actively pushing it to the routing agent, or by the routing agent actively pulling it from the Outbound Shuttle Log 8 on the User Computer. Further, the means by which an entry is transmitted into the Inbound Shuttle Log 11 of a User Computer from a routing agent may be accomplished by the Sync Agent 1 of the User Computer actively pulling it from the routing agent, or by the routing agent actively pushing it into the Inbound Shuttle 11 of the User Computer. In the preferred embodiment, the process of transmitting entries in the Inbound Shuttle Log 11 of a User Computer is accomplished specifically by the Sync Agent connecting to an SMTP email server and submitting each entry in the Log 11 to the email server as an individual email message with Sync Objects 7 as attachments in the body of the email message. Additionally, in the preferred embodiment, the process of transmitting entries from a holding location on a routing agent to the Inbound Shuttle Log 11 of an intended recipient is accomplished specifically by the Sync Agent 1 connecting to a POP3 email server, collecting email messages from a specific email account used only by this User Computer and inserting each of said email messages into the Inbound Shuttle Log 11 as a separate entry. FIGS. 9 and 10 illustrate subprograms of the invention which demonstrate this preferred embodiment. These subprograms are provided for illustrative purposes only and do not constitute actual aspects of the invention.

Referring to FIG. 9, the Outbound Shuttle Log 8 contains individual Shuttle Log entries which are to be sent to an SMTP Server. At step 1 the Sync Object Sender 9 subprogram selects the first entry in the Outbound Shuttle Log 8. At step 2, if a null set is returned from step 1, the subprogram returns control to the Sync Agent 1. Otherwise, at step 3, the subprogram loads a simple preference file from the computer into memory to obtain email server connection settings for use by this specifically by this User Computer. At step 4, the subprogram uses the settings provided and in conjunction with the SMTP protocol, establishes a connection to the desired email routing server. If an error is encountered, at step 13 the subprogram logs the error and returns control to the Sync Agent 1. Otherwise, the Outbound Shuttle Log 8 entry is passed to the SMTP email server in the form of an email message in compliance with the SMTP protocol. At step 7, the subprogram determines whether the message was sent successfully. If it was not, at step 14 the error is logged and control is passed to step 10. Otherwise, if no error was encountered at step 6, as determined by step 7, then at step 8 the subprogram archives the Shuttle Log 8 entry in a location external to the invention, as specified by preference. At step 9 the shuttle entry is removed and at step 10, the subprogram determines whether there are any more Outbound Shuttle Log 8 entries to pass. If there are not, the subprogram disconnects from the email server and returns control to the Sync Agent 1. Otherwise, the next Shuttle Log 8 entry is selected at step 12 and control is passed back to step 6 to repeat steps 6 through 10 until all Shuttle Log 8 entries are passed to the email server.

The contents of each computer's Outbound Shuttle Log 8 are transferred to a routing agent in accordance with FIG. 9. The routing agent (i.e., SMTP email server) operates on the "To" content of each Shuttle Log 8 entry in order to pass a copy of the entry to a mailbox used individually by each specified recipient. Once this has occurred, each Remote Computer can access its own mailbox at its own convenience to retrieve messages intended for inclusion in its Inbound Shuttle Log 11 and to eventually update its Remote Tables with changes that originated at a Local Computer.

Turning to FIG. 10, the Inbound Shuttle Log 11 is populated by performing a download routine from a POP3 email server. At step 1, the subprogram loads a preference file from the User Computer into memory for the purpose of having POP3 connection settings available. In step 2, the settings are used to connect to an email account on a POP3 email server which is specifically associated with the User Computer. At step 3, the subprogram determines whether an error was encountered during this connection attempt, and if so, the error is logged at step 13 and control is returned to the Sync Agent. Otherwise, at step 4, the subprogram requests the message count from the server and stores this in a local variable for reference. If the message count returned from the server is zero, then at step 5 the subprogram moves to step 11 to disconnect from the server and control to the Sync Agent 1. Returning to step 5, if the message count is greater than zero, then at step 6 the first message on the server is selected and at step 7 it is downloaded as an Inbound Shuttle Log 11 entry, retaining the From, To and Attachment aspects of the email message. At step 8 the subprogram ensures that the message was properly downloaded. If not, an error is logged at step 14 and control is passed to step 10. Otherwise, the email message is also archived in a location external to the Sync Agent 1, as specified by the preference file, and at step 10, the subprogram determines whether there are more messages on the server. If there are not, the subprogram disconnects from the email server and returns control to the Sync Agent 1. If there are additional messages on the email server, the subprogram selects the next message on the server and repeats steps 7, 8, 9, 10 and 12 until all messages have been selected. Once they have, control is returned to the Sync Agent 1.

Figure 6A:
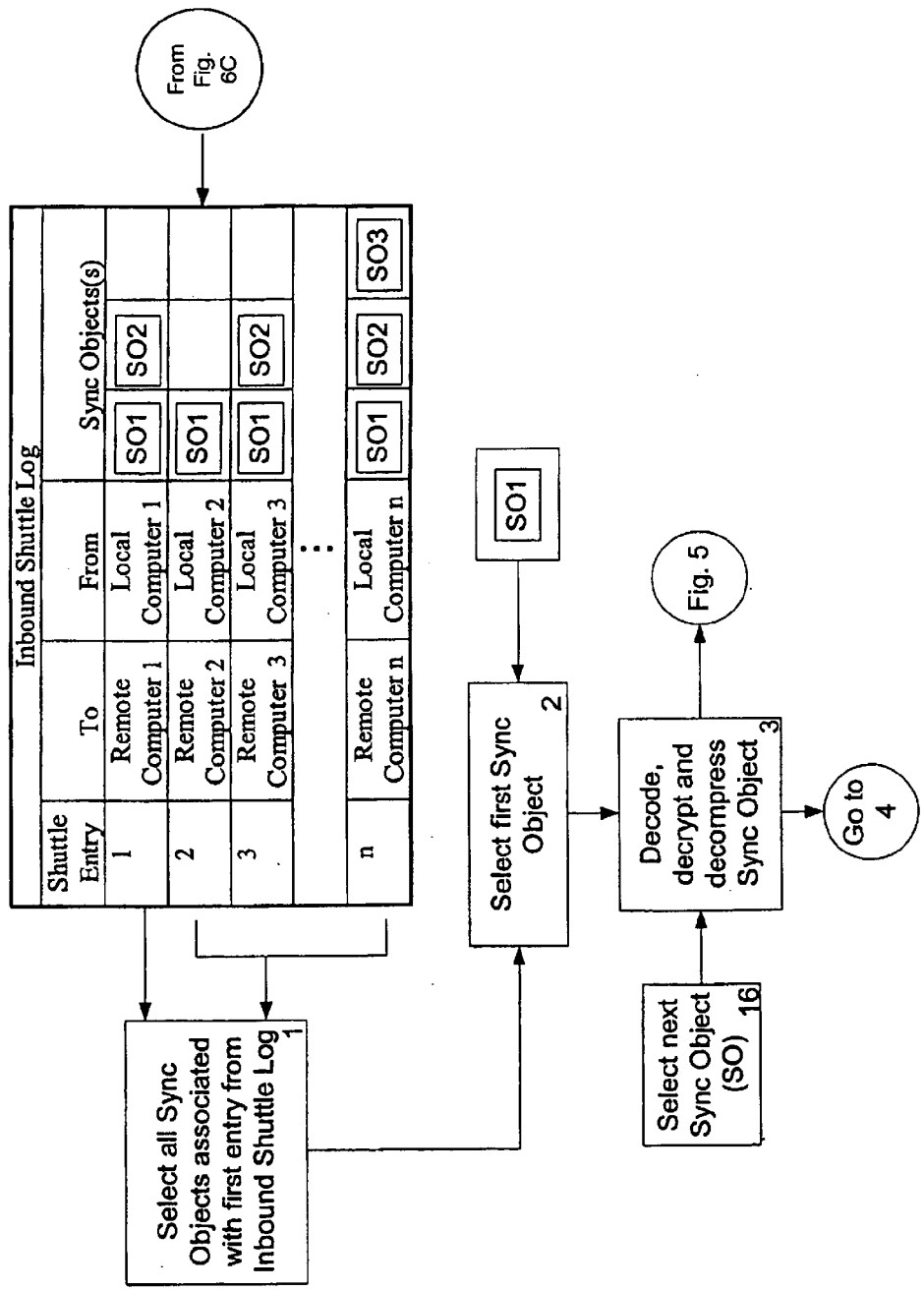
FIGS. 6A through 6C are flow charts illustrating the Sync Object Unpacker subprogram process.
Figure 6B:
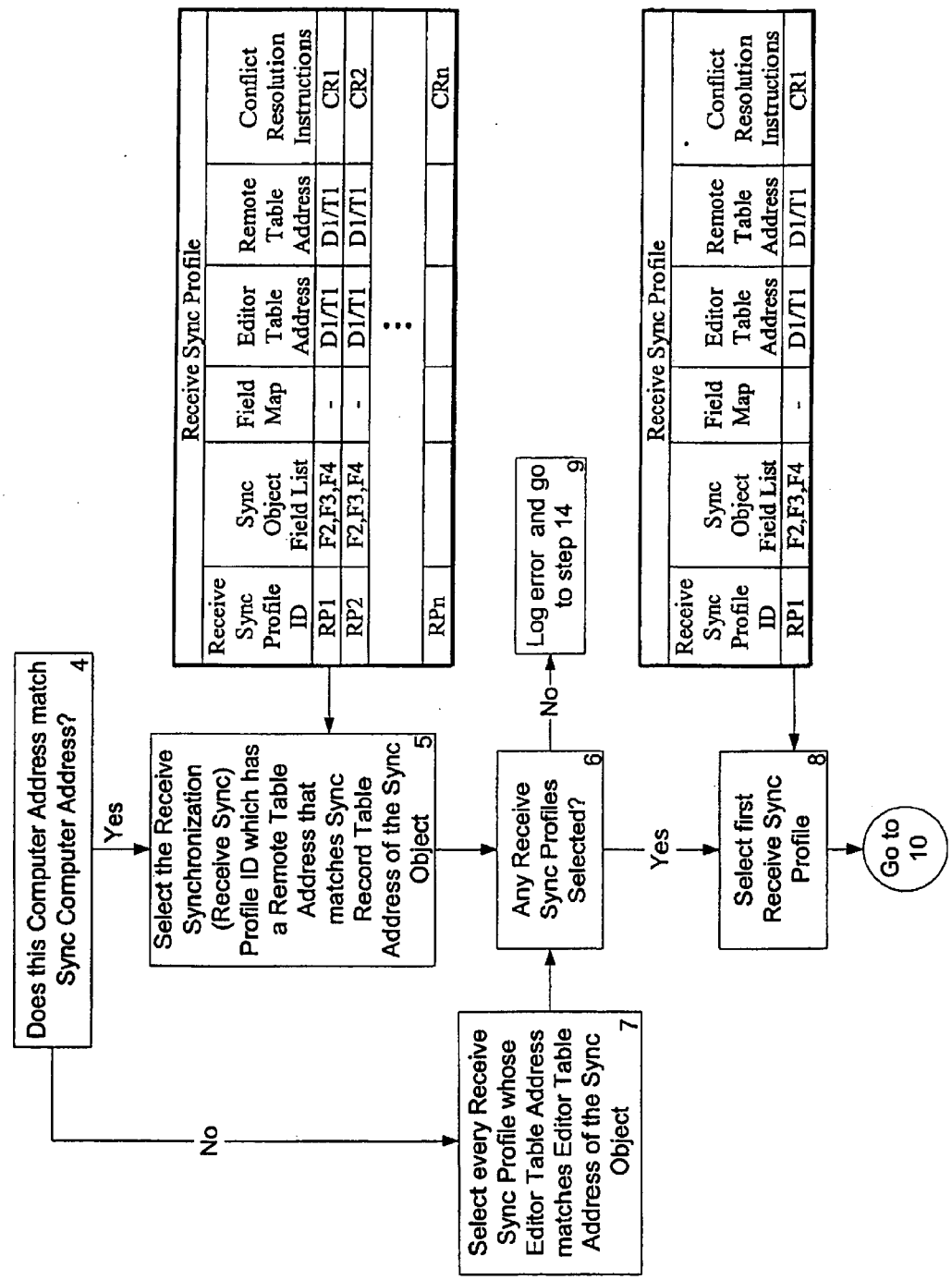
Figure 6C:
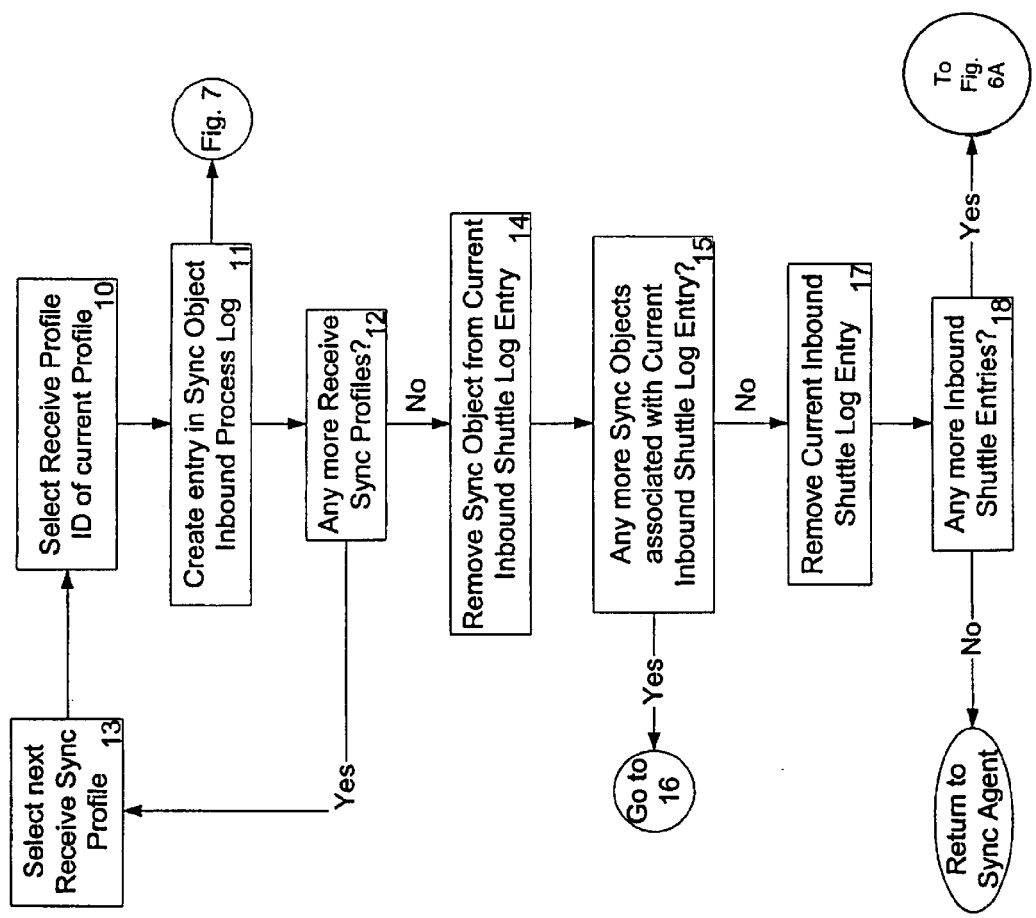

The flow chart set forth in FIGS. 6A, 6B and 6C describes the Sync Object Unpacker 12 subprogram which obtains all of the Sync Objects 7 stored within the Inbound Shuttle Log 11 and adds the Sync Objects 7 to the Inbound Process Log 13. At step 1, the Sync Object Unpacker 12 subprogram selects all Sync Objects from the Inbound Shuttle Log 11 which are associated with the first entry in the Log. At step 2, the Unpacker 12 subprogram selects the first Sync Object 7, which is illustrated in the figure as "S01". At step 3, the Unpacker 12 subprogram decodes, decrypts and decompresses the Sync Object 7, and stores the object in memory. As shown in the figure, the Sync Object 7 that has been received at the Remote Computer is identical to the Sync Object 7 that was sent by the Local Computer.

The Sync Object Unpacker 12 subprogram next determines at step 4 whether the Sync Computer Address (specified in Field No. 1 within the Object illustrated in FIG. 5) is the same as the address of the User Computer which has received the Sync Object 7. If the addresses are the same, then the Sync Object has been sent by an Editor to the Sync Computer for its approval of the Editor's change in the Original Record. At step 5, the Unpacker 12 subprogram selects the Receive Sync Profile 15 which has a Table Address that matches the Sync Record Table Address. This step is performed in order to obtain the Receive Profile that is associated with the Sync Record. At step 6, it is determined if any Receive Sync Profiles are selected. If the answer is "no", an error message is created at step 9 and the process continues at step 14, where the Sync Object 7 is removed from the Inbound Shuttle Log 11 entry. In the preferred embodiment, the logging of errors is done to a plain text file in a loosely structured format which includes the date and time the error was logged, an error code associated with the specific event which failed, a short description of the error encountered, and one or more reference Ids, as applicable to any one or more of the following: Send Sync Profile ID, Original Record ID, Sync Object ID, Receive Sync Profile ID. The error log is populated by the present invention to enable manual or automated monitoring of the Sync Agent 1 to determine and potentially resolve problem areas with the Profiles, specific Original Records or specific Sync Objects. On the other hand, if at step 4 the Unpacker 12 subprogram determines that the Sync Computer Address is not the same as the address of the User Computer which has received the Sync Object 7, then it follows that the Sync Object 7 has been sent by the Sync Computer to a Computer User or Subscriber. Then at step 7, the subprogram selects every Receive Profile whose Editor Table Address matches the Editor Table Address of the Sync Object 7. This causes all applicable Profiles for the current Sync Object 7 to be selected, and the Profiles are ultimately used to select and update all Corresponding Records within the Remote Databases.

If at least one Receive Profile is selected, then the Unpacker 12 subprogram selects the first Profile at step 8. At step 10 the Receive Profile ID of the current Profile is selected, and is associated at step 11 with the Sync Object 7 in order to create an entry in the Sync Object Inbound Process Log 13. An example of the Log 13 entry is illustrated in FIG. 7. As can be seen in the figure, the entry is identical to the Sync Object 7 with the sole exception being that the Sync Object 7 is now associated with a Profile Entry ("RPI") from the Receive Sync Profile 15. At step 12, the Unpacker 12 subprogram determines whether any more Receive Profiles exist. If so, the next Profile is selected at step 13, and the selection process continues until all Profiles have been selected and associated with the Sync Object 7.

When all Profiles have been processed, the Sync Object 7 is removed at step 14 from the current Inbound Shuttle Log 11 entry, and, at step 15, it is determined if any more Sync Objects 7 are associated with the current Inbound Shuttle Log 11 entry. If more Sync Objects exist, the next Sync Object 7 is selected at step 16, and steps 3 through 15 are repeated until all Sync Objects are processed. When it is determined, at step 15, that no more Sync Objects are associated with the current Inbound Shuttle Log 11 entry, the current entry at step 17 is removed from the Log 11, and at step 18, the Unpacker 12 subprogram determines whether any more Log 11 entries exist. If the answer is "yes", all Sync Objects associated with the next Log entry are selected at step 19, and the process described in steps 2 through 18 is repeated until all Inbound Shuttle Log 11 entries have been processed.

Any time after the Unpacker 12 subprogram has completed the process of adding Sync Object 7 entries to the Sync Object Inbound Process Log 13, control may be passed to the Sync Object Processor 14 subprogram which is responsible for using the Sync Objects 7 to potentially update Original Records within the Remote Database Tables. This process is described by the flow chart set forth in FIGS. 8A and 8B through 8E.

The Sync Object Processor 14 subprogram begins at step 1 in FIG. BA by selecting all entries in the Sync Object Inbound Process Log 13. At step 2, the entries are arranged in a Sync List in chronological order by Sync Object creation date and time (Field No. 8 from FIG. 5). At step 3, the Processor 14 subprogram selects the first Sync Object 7 in the Sync List for processing. Then at step 4, the subprogram processes the Sync Object 7 in order to potentially Synchronize a Remote Table on a User Computer with a Local Table where the Sync Object was created. This process at step 4 is described in detail by the Processor 14 subroutine program illustrated in FIG. 8B.

Figure 8A:
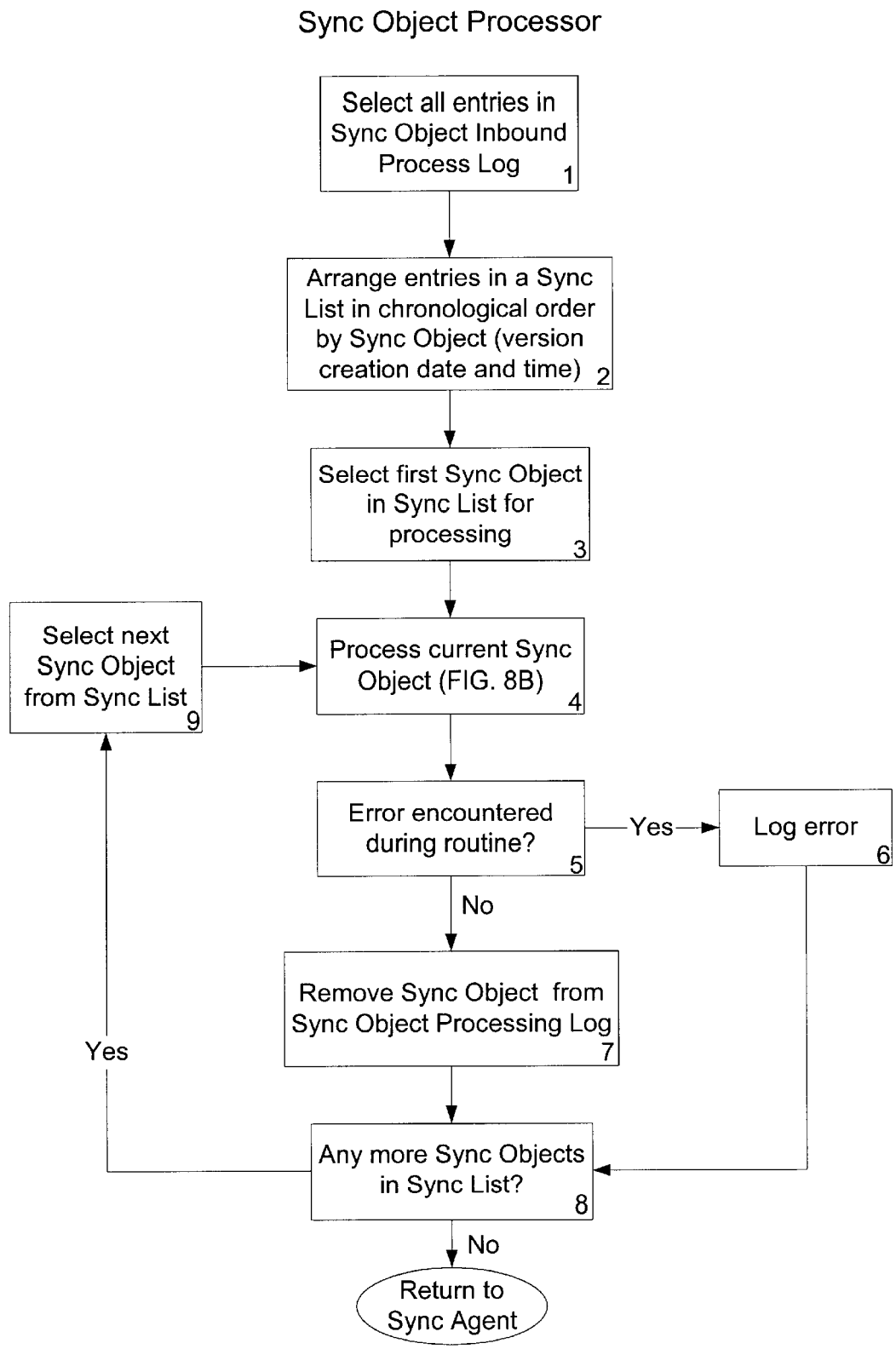
FIG. 8A is a flow chart illustrating the Sync Object Processor.
Figure 8B:
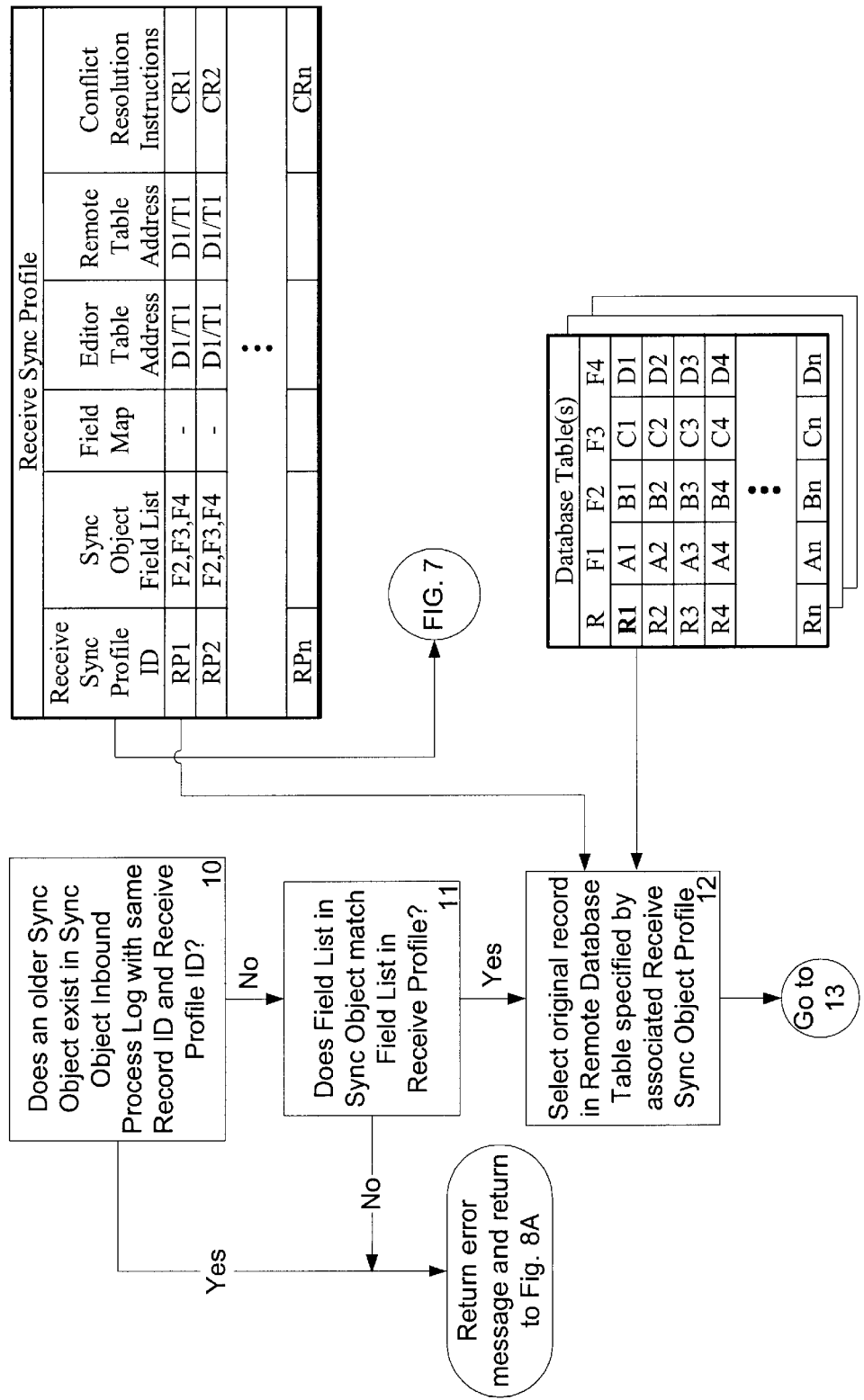
FIGS. 8B through 8E are flow charts illustrating a subroutine process within the Sync Object Processor.
Figure 8C:
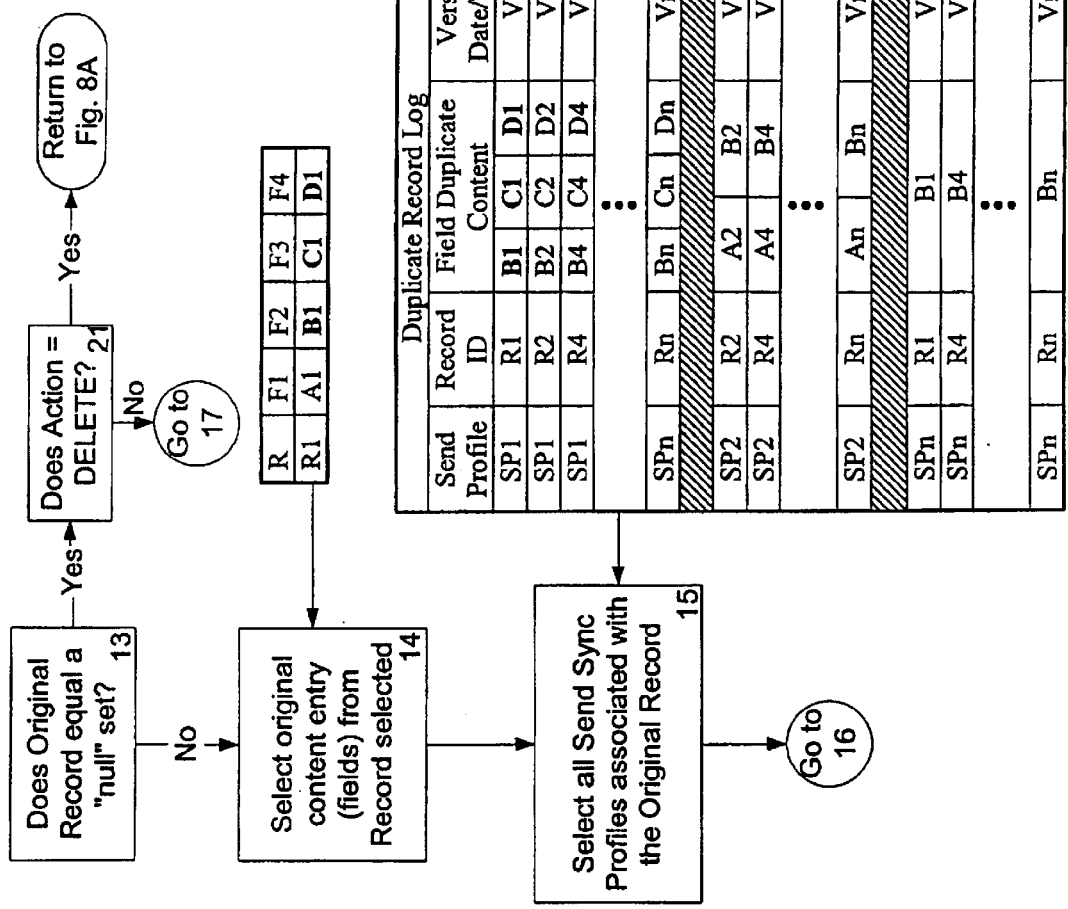
Figure 8D:
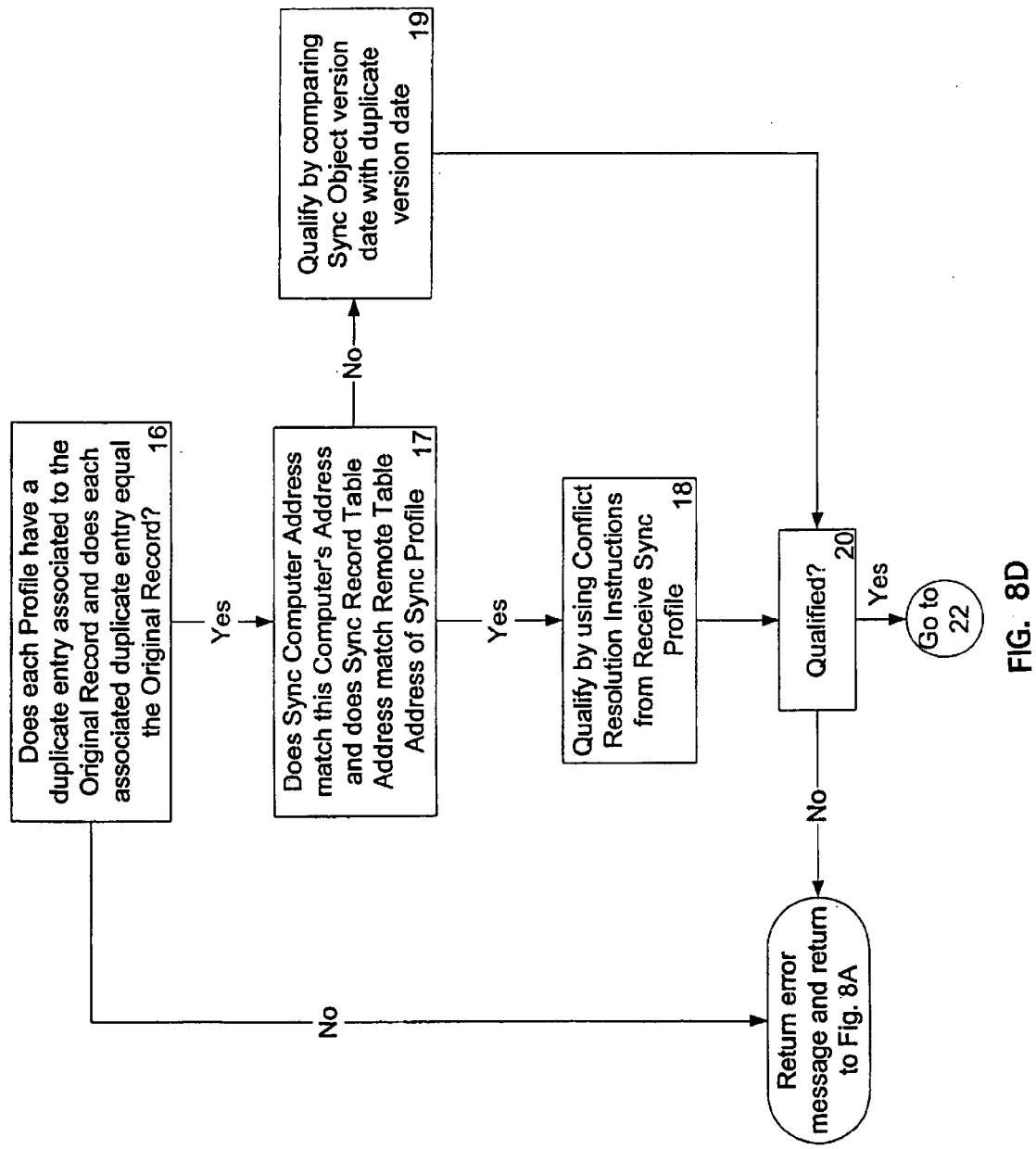
Figure 8E:
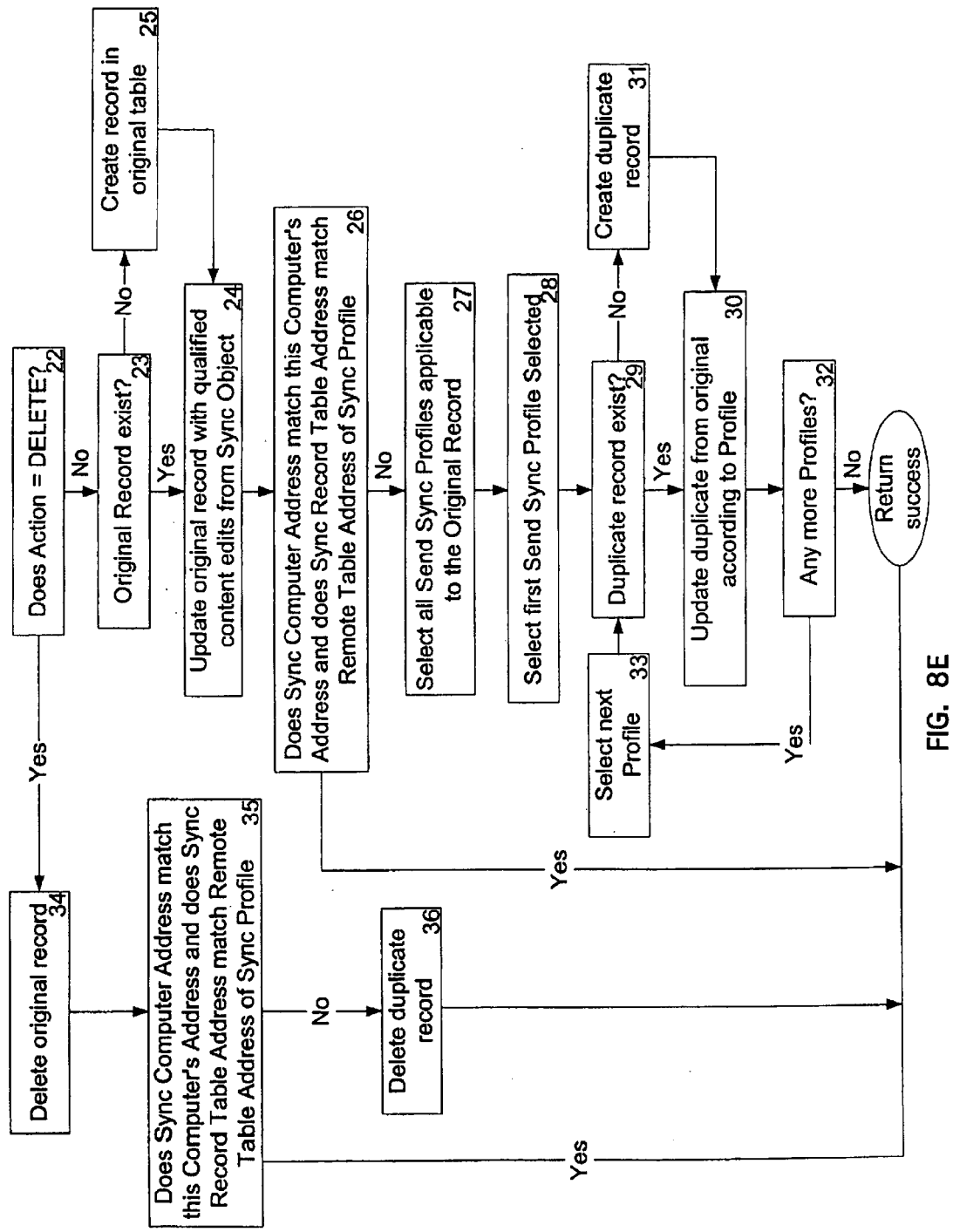

Generally, if an error is encountered in the subroutine program, control is returned from the subroutine to step 5 in FIG. 8A, and at step 6 and error message is logged so that a responsible Computer User or external application program may take appropriate action. If no error is encountered at step 5, the Sync Processor 14 subprogram at step 7 in FIG. 8A removes the Sync Object 7 from the Sync Object Inbound Processing Log 13. Then at step 8, the Processor 14 determines if any more Sync Objects exist in the Sync List. If more Sync Objects exist, the next Sync Object 7 is selected at step 9, and steps 4 through 8 are repeated until all Sync Objects 7 have been processed, at which time the Processor 14 returns control to the Sync Agent 1.

FIGs. 8B through 8E sets forth the subroutine program which processes the current Sync Object 7 described in step 4 of FIG. 8A. At step 10, the subroutine determines whether the Sync Object Inbound Process Log 13 contains an entry with a Sync Object 7 that has the same Record ID and Receive Sync Profile ID but which has an older creation date. This is done because the processing of a Sync Object 7 for the same Original Record may have been delayed due to a processing error. If an older Sync Object 7 is found, then an error is returned due to the fact that the Log 13 may contain two different changes to the same Original Record, and control is returned to step 5 of the Sync Object Processor 14 subprogram described in FIG. 8A. However, if no older Sync Object 7 is found, at step 11 it is determined whether the Sync Object's Field List (i.e., Fields subject to Synchronization) matches the Sync Object Field List contained within the Receive Sync Profile 15 which is associated with the corresponding entry from the Sync Object Inbound Process Log 13. If a match is found, then control passes to step 12. If no match is found, an error is returned and control is again returned to the Processor 14 subprogram.

At step 12, the subroutine selects an Original Record from the Remote Database Table specified by the associated Receive Sync Profile 15. In the example shown in FIG. 8B, the Remote Table address is D1/T1 and the Original Record is R1 containing Field content A1 B1 C1 D1 is selected. At step 13, the subroutine determines whether the Original Record's content is a "null" set (i.e., contains no content or values). If the Original Record's content does not contain a "null" set, then at step 14, the subroutine selects the original content from the Remote Database Table for the Fields which are subject to Synchronization. In the example, the Field content is B1 C1 D1. At step 15, the subroutine selects all Send Sync Profile 4 entries which are applicable to the Original Record. This is accomplished by selecting every Send Sync Profile 4 whose Local Table Address matches the table address of the Original Record and whose Record Selection Criteria includes the Original Record. At step 16, the subroutine determines if every Send Sync Profile 4 entry selected has an associated Duplicate Record in the Duplicate Record Log 6 for the Original Record and if the Filed Duplicate Content of each associated Duplicate Record entry matches the associated fields from the Original Record. If the answer to either query is "no," an error is returned and control returns to FIG. 8A. If the answer to both questions is "yes," then at step 17 the subroutine determines if the Original Record that has been selected is the Sync Record and if the Sync Object has been sent to the Sync Computer. This is done by determining whether the Sync Computer Address matches this User Computer's Address and whether the Sync Record Table Address matches the Remote Table Address of the Sync Profile. If both queries at step 17 are answered "no," then it has been determined that the Sync Object 7 entry has been sent by the Sync Computer to a Subscriber.

Returning to step 17, if the answer to both queries is "yes," then the subroutine at step 18 uses the Sync Object 7 to determine if the Original Record within the Remote Database Table has been changed before a Record could be updated based upon a different change in the same Record within the Local Database. If the answer to this query is "yes," a conflict arises due to the fact that two different changes to the same Record have been made. At this point, in a preferred embodiment, the subroutine uses the Conflict Resolution Instructions from the Receive Sync Profile 15 to automatically resolve the conflict by making appropriate changes to the after content of the Sync Object to reflect the nature of the resolution. Alternatively, a Computer User could be prompted to determine the means to resolve any conflict. The Conflict Resolution Instructions from the associated Receive Sync Profile 15 may also include conditions regarding acceptance of Sync Objects whose Action="New" or "Delete". A conflict arises in this case if the conditions are not met. Regardless of the manner in which conflicts are detected, if it these are resolved the Sync Object becomes qualified at step 20 or a qualification failure is encountered and control is returned to the Processor 14 subprogram.

On the other hand, if the answer to both questions at step 17 is "no," and the Sync Object 7 has been sent by the Sync Computer to a Subscriber, then at step 19 the subroutine determines if the version date and time of the Sync Object 7 is the same as the corresponding version date and time of the entry within the Duplicate Record Log 6, which is associated with the Corresponding Record. If the date and time of the entry within the Duplicate Record Log 6 is older than the date and time of the Sync Object 7, the Sync Object 7 is qualified at step 20. A qualification failure causes control to return to the Sync Object Processor 14 where at step 5, the nature of the error reported is ignored and control passes to step 6.

Returning to step 13, if the subroutine determines that the Original Record contains a "null" set, then at step 21 the subroutine examines the Sync Object to determine if the Original Record has been deleted (i.e., "Action=Delete"). If the Original Record has been deleted, then control is returned to the Processor 14 subprogram but without an error. Otherwise, control passes to step 17, where it is determined if the Sync Object 7 contains a change to a Record made by the Sync Computer, as described above.

Once the change in the Original Record has been qualified at step 20, the subroutine determines, at step 22, if the Sync Object Inbound Process Log 13 entry specifies that the Original Record at the Local Database Table has been deleted (i.e., does "Action=Delete"). If the Original Record has not been deleted, at step 23 the subroutine determines if the Original Record exists (i.e., the Record contains something other than a "null" set). If the Record exists, then at step 24 the Fields of the Original Record subject to Synchronization at the Remote Database are updated to match the qualified content of the corresponding "after" Fields as contained within the Sync Object 7. Returning to step 23, if no Original Record is found to exist, then at step 25 an Original Record is created in the appropriate Remote Database Table and at step 24, the Fields of the Original Record subject to Synchronization at the Remote Database are updated to match the qualified content of the corresponding "after" Fields as contained within the Sync Object 7.

Continuing at step 26, the subroutine again determines if the Original Record to be operated on is the Sync Record. If the answer is "yes," then Synchronization has been successful and control is returned to the Processor 14 where, at step 7 in FIG. 8A, the Sync Object 7 is removed from the Sync Object Processing Log 13 and at step 8, it is determined if any more Sync Objects 7 are in the Sync List that need to be processed.

If the query at step 26 is answered "no," (ie., the Sync Record is not being operated on) then at step 27, every Send Sync Profile 4 which is associated with the Original Record (by Table Address and Record Selection Criteria) is selected. At step 28, the first selected Profile 4 entry is selected and at step 29 it is determined whether there is a Duplicate Record in the Duplicate Record Log 6 associated to this Profile 4 entry and Original Record. If there is, then at step 30, the Duplicate record is updated based upon the Original Record's changed content and the Version Date/Time of the Duplicate Record is updated to contain the Version Date/Time of the Sync Object. On the other hand, if no Duplicate Record exists, then at step 31 a Duplicate Record is created to the Log 6 and at step 30, the Duplicate Record is updated as described in the previous sentence. At step 32, the subroutine determines whether there are any more Send Sync Profiles 4 selected, and if there are, the next profile is selected and steps 29 through 31 are repeated until it is determined at step 32 that no more profiles were selected.

Finally, returning to step 22, if the Original Record in the Local Database Table has been deleted, then the Original Record in the Remote Database Table is deleted at step 34. And, at step 35, the subroutine again determines if the Sync Record is being operated on. If the answer is "yes," Synchronization is complete and control is returned to the Processor 14. If the answer at step 35 is "no," then at step 36 all Duplicate Records associated with the Original Record are deleted from the Duplicate Record Log 6, which completes the Synchronization and control is returned to the Processor 14.

While the present invention has been described with reference to a few embodiments, the description is illustrative of the invention and is not to be construed as limiting the invention. Various modifications may occur to those skilled in the art without departing from the scope of the invention as defined by the appended claims.

What is claimed is:

1. A method of synchronizing a database table record with a corresponding database table record in a peer-to-peer computer network, comprising:
   (a) selecting an original record from an original database table, stored within the memory of a first computer, and storing the original record in the memory of the first computer;
   (b) identifying a first content from at least one field within the original record;
   (c) creating a duplicate first content in the memory of the first computer by duplicating the first content;
   (d) creating a modified first content by modifying the first content within the original record;
   (e) creating a synchronization object in the memory of the first computer, which object contains a copy of the duplicate first content and a copy of the modified first content;
   (f) addressing the synchronization object to a second computer;
   (g) transmitting the synchronization object at any time to the second computer where the object is stored within the memory of the second computer;
   (h) selecting a corresponding record from a corresponding database table, stored within the memory of the second computer, which corresponding record and corresponding database table correspond respectively to the original record and original database table;
   (i) identifying a corresponding content from at least one field within the corresponding record, which corresponding content corresponds to the first content;
   (j) comparing the duplicate first content to the corresponding content; and
   (k) updating the corresponding content to match the modified first content if the duplicate first content matches the corresponding content.

2. A method of synchronizing a database table record with a corresponding database table record in a peer-to-peer computer network, comprising:
   (a) selecting an original record from an original database table, stored within the memory of a first computer;
   (b) identifying a first content from at least one field within the original record;
   (c) creating a duplicate first content in the memory of the first computer by duplicating the first content;
   (d) creating a modified first content by modifying the first content within the original record;
   (e) creating a synchronization object in the memory of the first computer, which object contains a copy of the duplicate first content and a copy of the modified first content;
   (f) addressing the synchronization object to at least one second computer;
   (g) transmitting the synchronization object at any time to the at least one second computer where the object is stored within the memory of the at least one second computer;
   (h) selecting a corresponding record from a corresponding database table, stored within the memory of the at least one second computer, which corresponding record and corresponding database table correspond respectively to the original record and original database table;

(i) identifying a corresponding content from at least one field within the corresponding record, which corresponding content corresponds to the first content; and (j) updating the corresponding content to match the modified first content.

3. A method of synchronizing a database table record with a corresponding database table record in a peer-to-peer computer network, comprising:

(a) selecting an original record from an original database table, stored within the memory of a first computer;

(b) identifying a first content from at least one field within the original record;

(c) creating a duplicate first content in the memory of the first computer by duplicating the first content;

(d) creating a modified first content by modifying the first content within the original record;

(e) creating a synchronization object in the memory of the first computer, which object contains a copy of the duplicate first content and a copy of the modified first content;

(f) addressing the synchronization object to at least one second computer;

(g) associating the synchronization object with a first version number which corresponds to the date and time the synchronization object was created;

(h) transmitting the synchronization object at any time to the at least one second computer where the object is stored within the memory of the at least one second computer;

(i) selecting a corresponding record from a corresponding database table, stored within the memory of the at least one second computer, which corresponding record and corresponding database table correspond respectively to the original record and original database table;

(j) identifying a corresponding content from at least one field within the corresponding record, which corresponding content corresponds to the first content;

(k) creating a modified corresponding content within the corresponding record by updating the corresponding content to match the modified first content;

(l) creating a duplicate modified corresponding content in the memory of the at least one second computer by duplicating the duplicate modified content; and (m) associating the duplicate modified corresponding content with the first version number.

4. A method of synchronizing a database table record with a corresponding database table record in a peer-to-peer computer network, comprising:

(a) selecting an original record from an original database table, stored within the memory of a first computer;

(b) identifying a first content from at least one field within the original record;

(c) creating a duplicate first content in the memory of the first computer by duplicating the first content;

(d) creating a first modified original record and an associated modified first content by modifying the first content within the original record;

(e) creating a first synchronization object in the memory of the first computer, which object contains a copy of the duplicate first content and a copy of the modified first content;

(f) addressing the synchronization object to at least one second computer;

(g) associating the first synchronization object with a first version number which corresponds to the date and time the first synchronization object was created;

(h) transmitting the first synchronization object at any time to the at least one second computer where the object is stored within the memory of the at least one second computer;

(i) selecting a corresponding original record from a corresponding original database table, stored within the memory of the at least one second computer, which corresponding original record and corresponding original database table correspond respectively to the original record and original database table;

(j) identifying a corresponding first content from at least one field within the corresponding original record, which corresponding first content corresponds to the first content;

(k) creating a modified corresponding original record and an associated modified corresponding first content within the corresponding original record by updating the corresponding first content to match the modified first content;

(l) creating a duplicate modified corresponding first content in the memory of the at least one second computer by duplicating the modified corresponding first content;

(m) associating the duplicate modified corresponding first content with the first version number;

(n) selecting the first modified original record from the original database table, stored within the memory of the first computer;

(o) identifying a second content from at least one field within the first modified original record;

(p) creating a duplicate second content in the memory of the first computer by replacing the duplicate first content with the duplicate second content;

(q) creating a second modified original record and an associated modified second content by modifying the second content within the first modified original record;

(r) creating a second synchronization object in the memory of the first computer, which object contains a copy of the duplicate second content and a copy of the modified second content;

(s) associating the second synchronization object with a second version number which corresponds to the date and time the second synchronization object was created;

(t) addressing the synchronization object to the at least one second computer;

(u) transmitting the second synchronization object at any time to the at least one second computer where the object is stored within the memory of the at least one second computer;

(v) selecting a corresponding first modified original record from the corresponding original database table, stored within the memory of the second computer, which corresponding first modified original record and corresponding original database table correspond respectively to the first modified original record and original database table;

(w) identifying a corresponding second content from at least one field within the corresponding first modified original record, which corresponding second content corresponds to the second content;

(x) creating a modified corresponding first modified original record and an associated corresponding second content within the corresponding first modified original record by updating the corresponding second content to match the modified second content if the time and date associated with the second version number is more recent than the time and date associated with the first version number and the duplicate modified corresponding first content matches the corresponding second content.

5. A method of providing a new record in a first database table to a corresponding database table, comprising:

(a) selecting a new original record in the first database table within the memory of the first computer;

(b) identifying new content from at least one field within the new original record;

(c) creating a synchronization object in the memory of the first computer, which object contains a copy of the new content;

(d) addressing the synchronization object to at least one second computer;

(e) transmitting the synchronization object at any time to the at least one second computer where the object is stored within the memory of the at least one second computer;

(f) selecting a corresponding database table stored within the memory of the at least one second computer, which corresponding database table corresponds to the first database table; and (g) creating a corresponding new original record in corresponding database table, which corresponding new original record contains the new content.

6. The method of claim 1, 2, 3, 4 or 5 in which the step of transmitting the synchronization object comprises: enclosing the synchronization object in a dispatch message; pushing the message by the first computer to a routing agent; and pushing the message by the routing agent to the second computer.

7. The method of claim 1, 2, 3, 4 or 5 in which the step of transmitting the synchronization object comprises: enclosing the synchronization object in a dispatch message; pulling the message by a routing agent from the first computer; and pulling the message by the second computer from the routing agent.

8. The method of claim 1, 2, 3, 4 or 5 in which the step of transmitting the synchronization object comprises: enclosing the synchronization object in a dispatch message; pushing the message by the first computer to a routing agent; and pulling the message by the second computer from the routing agent.

9. The method of claim 1, 2, 3, 4 or 5 in which the step of transmitting the synchronization object comprises: enclosing the synchronization object in a dispatch message; pulling the message by the routing agent from the first computer; and pushing the message by the routing agent to the second computer.

10. The method of claim 1, 2, 3, 4 or 5 in which transmitting the synchronization object comprises: enclosing the synchronization object in an email message; pushing the message by the first computer to a communications server; and pulling the message by the second computer from the communications server.

* * * * *